United States Patent
Chui et al.

(10) Patent No.: US 7,362,063 B1
(45) Date of Patent: *Apr. 22, 2008

(54) MOTOR SPINDLE CONTROL SYSTEM AND METHOD

(75) Inventors: Siew Yong Chui, Singapore (SG); Foo Leng Leong, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 11/677,961

(22) Filed: Feb. 22, 2007

Related U.S. Application Data

(63) Continuation of application No. 11/345,850, filed on Feb. 1, 2006, now Pat. No. 7,196,484.

(60) Provisional application No. 60/709,448, filed on Aug. 19, 2005.

(51) Int. Cl.
*H02K 23/00* (2006.01)

(52) U.S. Cl. ............... 318/254; 318/138; 318/439; 318/805

(58) Field of Classification Search ........... 318/254, 318/138, 439, 805
See application file for complete search history.

(56) References Cited

U.S. PATENT DOCUMENTS

| | | | |
|---|---|---|---|
| 5,504,402 A * | 4/1996 | Menegoli ............. | 318/377 |
| 6,094,022 A * | 7/2000 | Schillaci et al. ............. | 318/254 |
| 6,236,174 B1 * | 5/2001 | White ............. | 318/254 |
| 6,259,099 B1 * | 7/2001 | Foulon et al. ............. | 250/370.14 |
| 6,323,610 B1 * | 11/2001 | Ng et al. ............. | 318/254 |
| 6,628,096 B1 * | 9/2003 | Chen ............. | 318/254 |
| 7,098,621 B1 * | 8/2006 | Leong et al. ............. | 318/568.24 |
| 2002/0027423 A1 * | 3/2002 | White ............. | 318/254 |

* cited by examiner

*Primary Examiner*—Rita Leykin

(57) ABSTRACT

In a method for measuring motor speed and position by detecting the back-EMF generated during pole-pair interactions, fluctuations of a three-phase motor power supply that may affect back-EMF detection are reduced. One phase of the power supply is tristated for a certain interval preceding and during back-EMF detection. For a shorter interval during back-EMF detection, the voltage drop across the motor is reduced from the full power supply voltage. This preferably is accomplished either by pulling a first of the other two power supply phases low, while pulling a second of the other two power supply phases up to a regulated voltage below the power supply voltage, or by pulling the second of the other two phases up to the power supply voltage and pulling the first of the other two phases down to a regulated voltage above ground.

35 Claims, 20 Drawing Sheets

MOTOR SPINDLE CONTROL SYSTEM AND METHOD

CROSS REFERENCE TO RELATED APPLICATION

This is a continuation of commonly-assigned U.S. patent application Ser. No. 11/345,850, filed Feb. 1, 2006, now U.S. Pat. No. 7,196,484, which claims the benefit of U.S. Provisional Patent Application No. 60/709,448, filed Aug. 19, 2005, now abandoned therewith.

BACKGROUND OF THE INVENTION

This invention relates to a system and method for controlling the spindle of an electric motor, and more particularly to a system and method for controlling the spindle of a motor that rotates the platter of a disk drive.

Controlling the speed at which the platter of a disk drive rotates is very important, particularly as storage densities increase and platter size decreases. Thus, in a microdrive—i.e., a drive having a platter diameter of about 1 inch or less—even a small error in angular position resulting from an error in speed control may result in an incorrect sector being read or written. It is therefore a nominal goal to determine disk speed to within 0.01%.

Position, and therefore speed, of a disk drive platter is commonly determined by detecting the back electromagnetic field (back-EMF) generated when one of the rotor poles passes one of the stator poles. For example, it is typical for a disk drive motor to have six poles, so that each pole-pair interaction theoretically signifies 60° of motor rotation. However, in practice, it is difficult during manufacturing to accurately position the poles. Therefore, in practice, some sets of adjacent poles may be closer together than 60°, and other sets of adjacent poles may be further apart than 60°. These offsets may be slight, but may be enough to prevent achieving the desired 0.01% accuracy.

Copending, commonly-assigned U.S. patent application Ser. No. 11/104,683, filed Apr. 12, 2005, which is hereby incorporated by reference herein in its entirety, describes a method and apparatus for deriving calibration data for a motor, and a method and apparatus for controlling a motor using that calibration data. In accordance with those methods and apparatus, one phase of the motor power supply is suppressed (i.e., tristated) during a time duration when back-EMF is expected to be detected, and at the same time one of the other phases is grounded and the third phase is pulled high. If the back-EMF is detected outside that duration, the duration is expanded. This is iterated until the back-EMF falls within the expanded duration.

It has been found that when the one phase of the motor power supply is tristated during back-EMF detection, corresponding current spikes occur in the phases that have not been tristated. Thus, there may be a positive current spike in the phase that has been pulled high, and a negative current spike in the phase that has been grounded. These spikes cause spindle speed jitter and acoustic noise, and moreover increase the peak supply current.

It therefore would be desirable to be able to minimize current variations in the phases of a motor power supply during back-EMF detection.

SUMMARY OF THE INVENTION

The current variations in the phases of a motor power supply during back-EMF detection can be minimized by regulating the power supply voltage during the back-EMF detection period. Providing a lower power supply voltage drop during that time reduces the current spikes in the power supply. By choosing the lowered power supply voltage drop properly, the spikes in the current can be reduced to barely detectable irregularities. In order to allow any transients resulting from the tristating of the phase that is tristated to settle out, that phase preferably is tristated at least 2 μs to 5 μs prior to the back-EMF detection period. The amount of time ahead of the $T_{freeze}$ period that that phase is tristated is a function of many factors, including motor form factor and inductance and other variables, and may be programmable.

The power supply voltage preferably is adjusted to about the average voltage across the motor during a complete power supply cycle. The power supply may be pulse-width modulated and the pulse width modulation may be trapezoidal or sinusoidal. In the trapezoidal mode, the supply voltage is substantially constant when turned on, so the average is determined by multiplying the supply voltage by the duty cycle, as derived from a digital-to-analog converter that programs the spindle drive current (spindle DAC). In the sinusoidal mode, the voltage varies, so the duty cycle as derived from the spindle DAC is further modified by a drive pattern factor. The drive pattern factor varies continually between 0 and 1, so preferably it is approximated as a constant, such as about 0.5. Preferably, an adjustment is provided so that the user can fine-tune the constant drive pattern value to minimize the actual current spike.

In one preferred embodiment, the voltage drop across the motor is regulated by setting the supply voltage as the high voltage and regulating the low voltage. In another preferred embodiment, the voltage drop across the motor is regulated by setting the low voltage to ground and regulating the high voltage.

Therefore, in accordance with the present invention, there is provided a method for controlling an electric motor of a type whose speed is measured by detecting back-EMF from pole-pair interaction. The method includes establishing a back-EMF detection period, reducing voltage drop across the motor at least during the detection period, tristating a first phase of the motor at least while the voltage drop is reduced, pulling power to a second phase of said motor up to an upper end of the reduced voltage drop, and pulling power to a third phase of the motor down to a lower end of the reduced voltage drop. Apparatus for carrying out the method, including drivers for the respective phases of the motor, is also provided.

There is also provided apparatus for controlling a motor of a type whose speed is measured by detecting back-EMF from pole-pair interaction. The apparatus comprises means for establishing a back-EMF detection period, means for reducing voltage drop across said motor at least during the detection period, means for tristating a first phase of said motor at least while said voltage drop is reduced, means for pulling power to a second phase of said motor to an upper end of said reduced voltage drop, and means for pulling power to a third phase of said motor to a lower end of said reduced voltage drop.

In one embodiment, the means for tristating tristates the first phase prior to the detection period.

In another embodiment, the means for reducing comprises means for regulating lower end of the voltage drop such that the voltage across the motor ranges between the supply voltage and a voltage above ground.

In another embodiment, the means for regulating comprises means for feeding back the lower end of the voltage drop, and means for comparing the fed back lower end of the voltage drop to a reference voltage above ground.

In another embodiment, the apparatus further comprises means for determining the reference voltage above ground including means for applying a duty cycle factor to the supply voltage.

In another embodiment, the voltage drop across the motor varies trapezoidally over time, and the duty cycle factor comprises a ratio of a user motor speed setting to a maximum motor speed setting.

In another embodiment, the voltage drop across said motor varies sinusoidally over time; and said duty cycle factor comprises a product of (a) a ratio of a user motor speed setting to a maximum motor speed setting, and (b) a factor representing sinusoidal variation of said time-varying voltage.

In another embodiment, the factor representing sinusoidal variation of the time-varying voltage is approximated as a constant.

In another embodiment, the constant is about 0.5.

In another embodiment, the apparatus further comprises means for adjusting the constant.

In another embodiment, the means for reducing comprises means for regulating the upper end of the voltage drop such that the voltage drop across the motor ranges between ground and a voltage below the supply voltage.

In another embodiment, the means for regulating comprises means for feeding back the upper end of the voltage drop, and means for comparing the fed back upper end of the voltage drop to a reference voltage below the supply voltage.

In another embodiment, the apparatus further comprises means for determining the reference voltage below the supply voltage including means for applying a duty cycle factor to the supply voltage.

In another embodiment, the voltage drop across the motor varies trapezoidally over time, and the duty cycle factor comprises a ratio of a user motor speed setting to a maximum motor speed setting.

In another embodiment, the voltage drop across the motor varies sinusoidally over time, and the duty cycle factor comprises a product of (a) a ratio of a user motor speed setting to a maximum motor speed setting, and (b) a factor representing sinusoidal variation of the time-varying voltage.

In another embodiment, the factor representing sinusoidal variation of the time-varying voltage is approximated as a constant.

In another embodiment, the constant is about 0.5.

In another embodiment, the apparatus further comprises means for adjusting the constant.

In another embodiment, the voltage drop across the motor varies over time, and said means for reducing comprises means for reducing the voltage drop to an average value of the time-varying voltage drop.

In another embodiment, the means for reducing comprises means for applying a duty cycle factor to the supply voltage.

In another embodiment, the time-varying voltage varies trapezoidally, and the duty cycle factor comprises a ratio of a user motor current setting to a maximum motor current setting.

In another embodiment, the time-varying voltage varies sinusoidally, and the duty cycle factor comprises a product of (a) a factor representing sinusoidal variation of the time-varying voltage, and (b) a ratio of a user motor current setting to a maximum motor current setting.

In another embodiment, the factor representing sinusoidal variation of the time-varying voltage is approximated as a constant.

In another embodiment, the constant is about 0.5.

In another embodiment, the apparatus further comprises means for adjusting the constant.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

The invention will now be described with reference to FIGS. 1-13.

Figure 1:
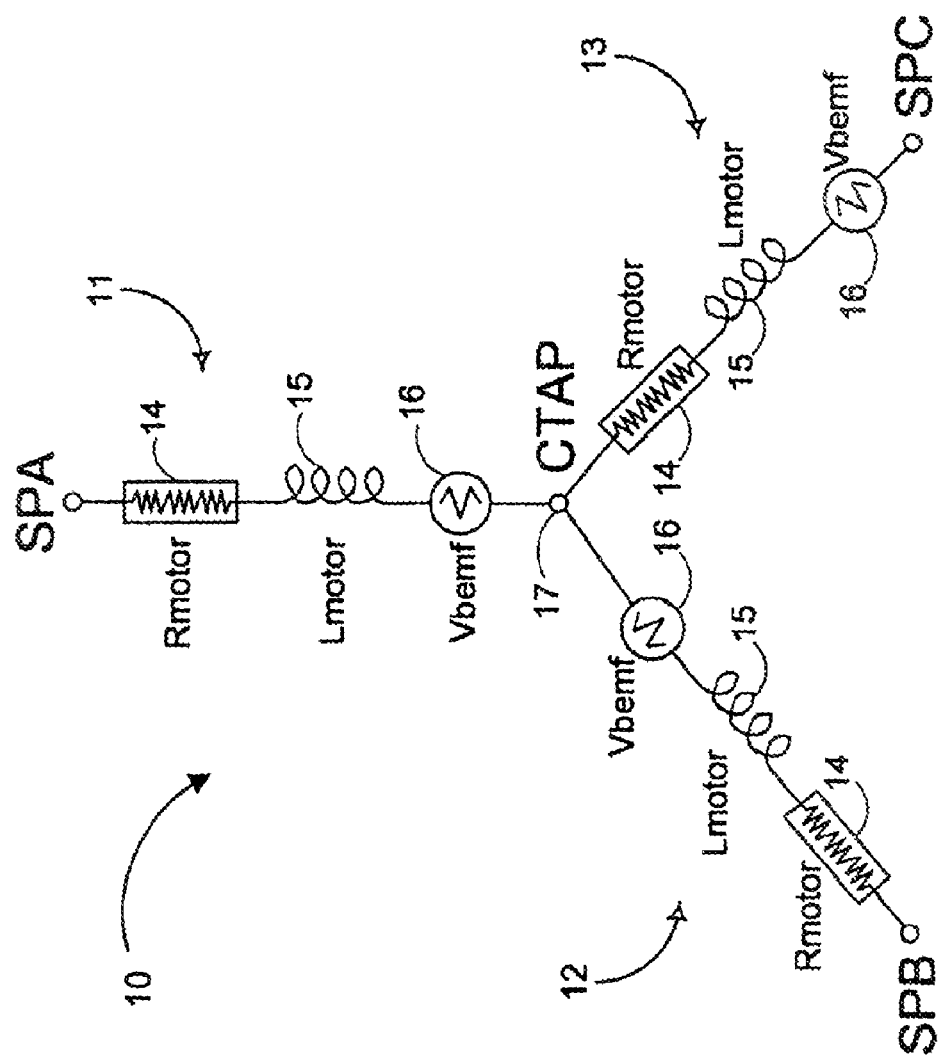
FIG. 1 is a schematic view of a three-phase motor.

FIG. 1 shows, schematically, the three phases A (11), B (12) and C (13) of a three-phase motor 10 with which the present invention may be used It should be remembered that the view of FIG. 1 is theoretical, notwithstanding that it looks like the rotor of a three pole-pair motor. The number of pole-pairs in the motor is completely independent of the number of power supply phases and the present invention will work with substantially any three-phase motor regardless of the number of pole-pairs.

As seen in FIG. 1, each phase A (11), B (12), C (13) of motor 10 may be modeled as a motor resistance $R_{motor}$ 14, a motor inductance $L_{motor}$ 15 and back-EMF voltage $V_{BEMF}$ 16 in series between a respective power supply phase SPA (110), SPB (120), SPC (130) and a central tap $C_{tap}$ 17 to which all phases are connected. Although the order of these components 14, 15, 16 is reversed in phase C (13) as compared to phases A (11) and B (12), the result would be the same if phase C (13) were identical to phases A (11) and B (12).

The motor power supply can be driven in linear or pulse width modulation (PWM) mode. For power efficiency, PWM mode is preferred. As described above and in above-incorporated application Ser. No. 11/104,683, motor speed can be measured by detecting back-EMF voltage resulting from pole-pair interactions. In accordance with application Ser. No. 11/104,683, during back-EMF detection, a period known as $T_{freeze}$ is introduced, during which there is no current switching activity. During this period, the phase to be detected is tristated, a first one of the other phases is driven high and the second one of the other phases is driven low.

It has been found that if such a speed detection method is used, current in the phases driven high and low is affected. Specifically, as one phase is driven high, current in that phase spikes sharply positive, and as the other phase is driven low, the current in that phase spikes sharply negative.

Figure 2:
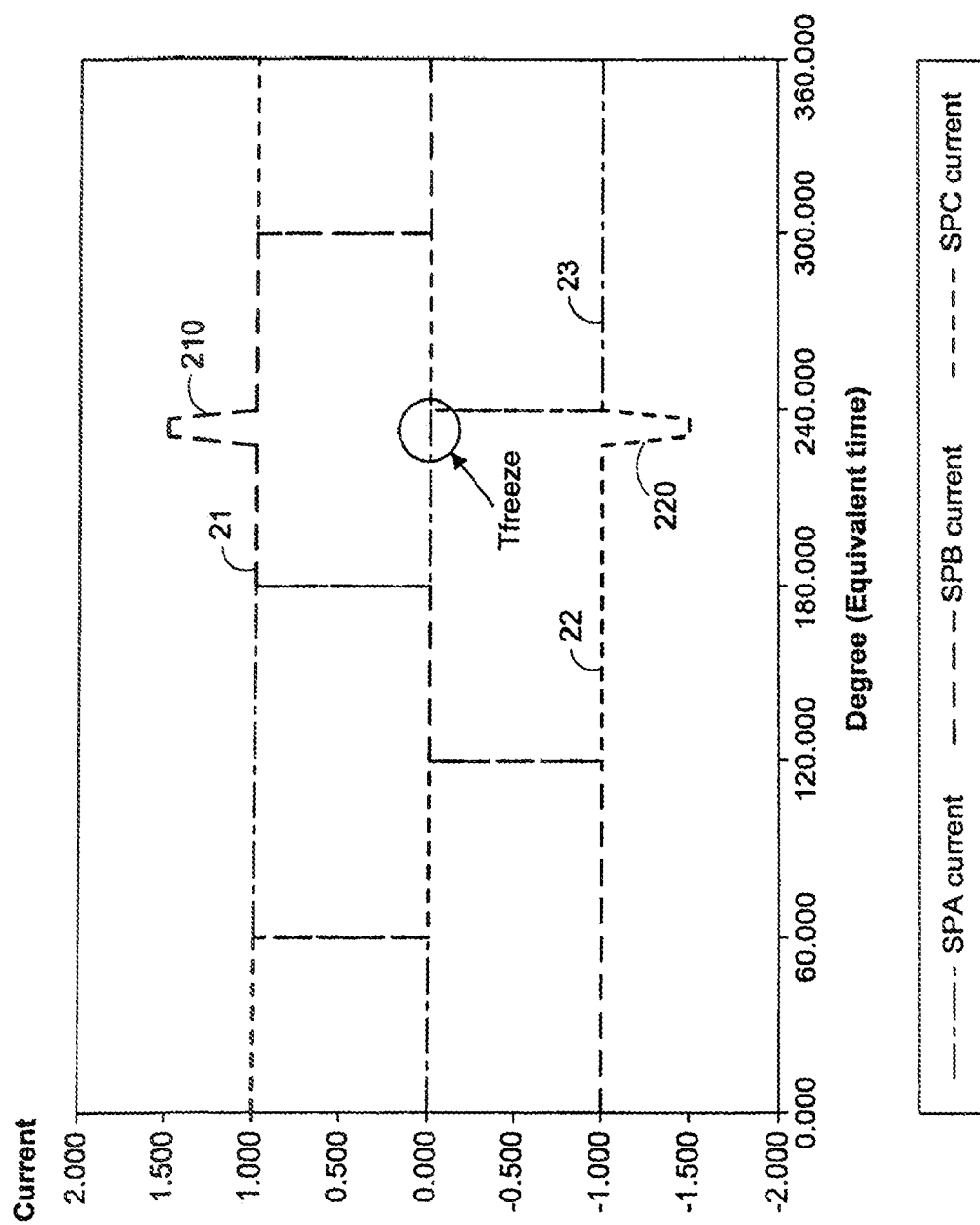
FIG. 2 is a graphical representation of current in the motor of FIG. 1 in trapezoidal drive mode without the present invention.

FIG. 2 illustrates this effect in the case of a trapezoidal drive current. Trace 21 is a representation of an exemplary normalized trapezoidal current waveform in phase B, while trace 22 is a representation of an exemplary normalized trapezoidal current waveform in phase C. Circle 20 represents the $T_{freeze}$ period of phase A (waveform 23). As can be seen, during that period there is a sharp positive spike 210 in current waveform 21, and a sharp negative spike 220 in current waveform 22.

Figure 3:
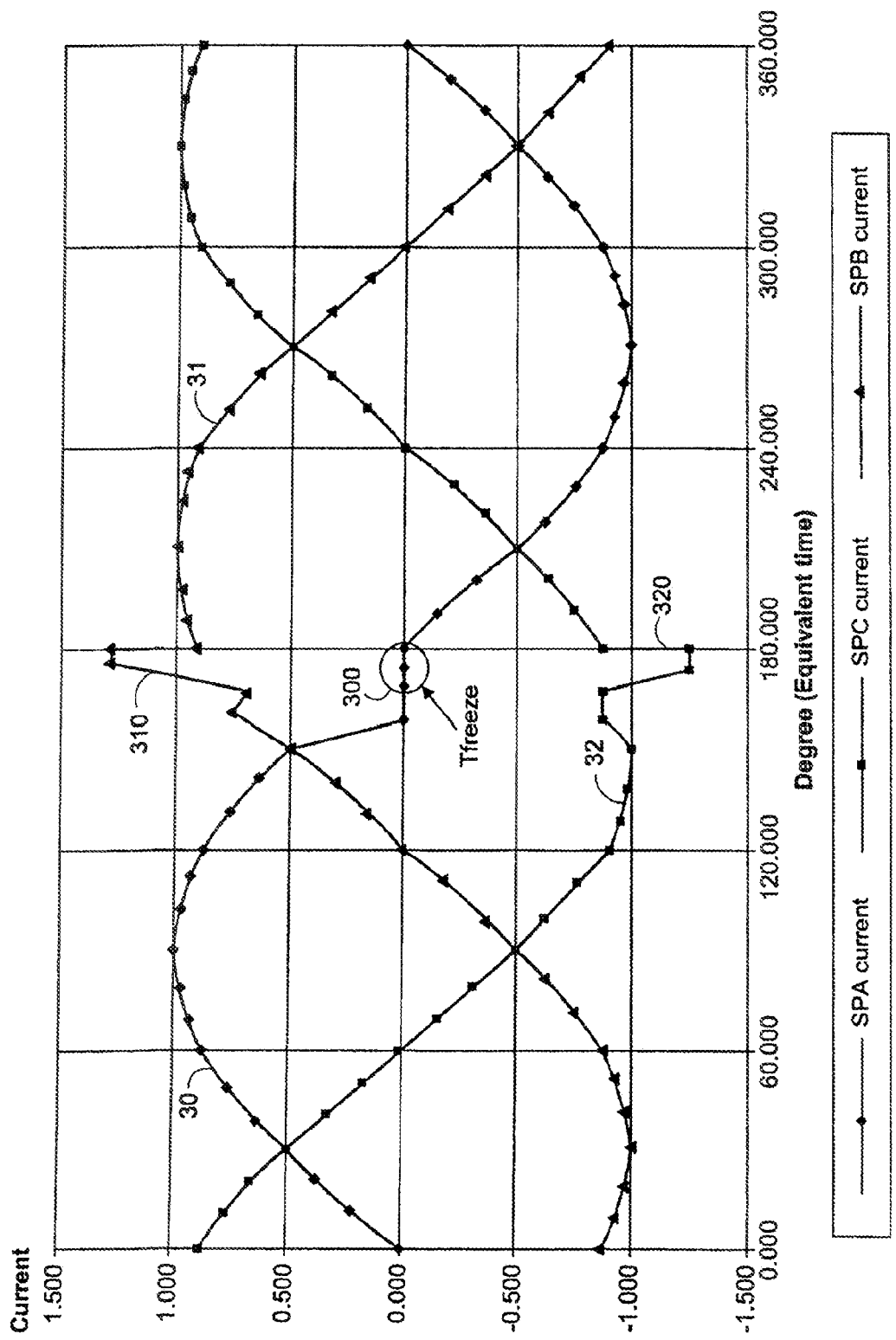
FIG. 3 is a graphical representation of current in the motor of FIG. 1 in sinusoidal drive mode without the present invention.

Similarly, FIG. 3 illustrates this effect in the case of a sinusoidal drive current. Trace 30 is a representation of an exemplary normalized sinusoidal current waveform in phase A, trace 31 is a representation of an exemplary normalized sinusoidal current waveform in phase B, and trace 32 is a representation of an exemplary normalized sinusoidal current waveform in phase C. Circle 300 represents the $T_{freeze}$ period of phase A. As can be seen, during that period there is a sharp positive spike 310 in current waveform 31, and a sharp negative spike 320 in current waveform 32.

Figure 4:
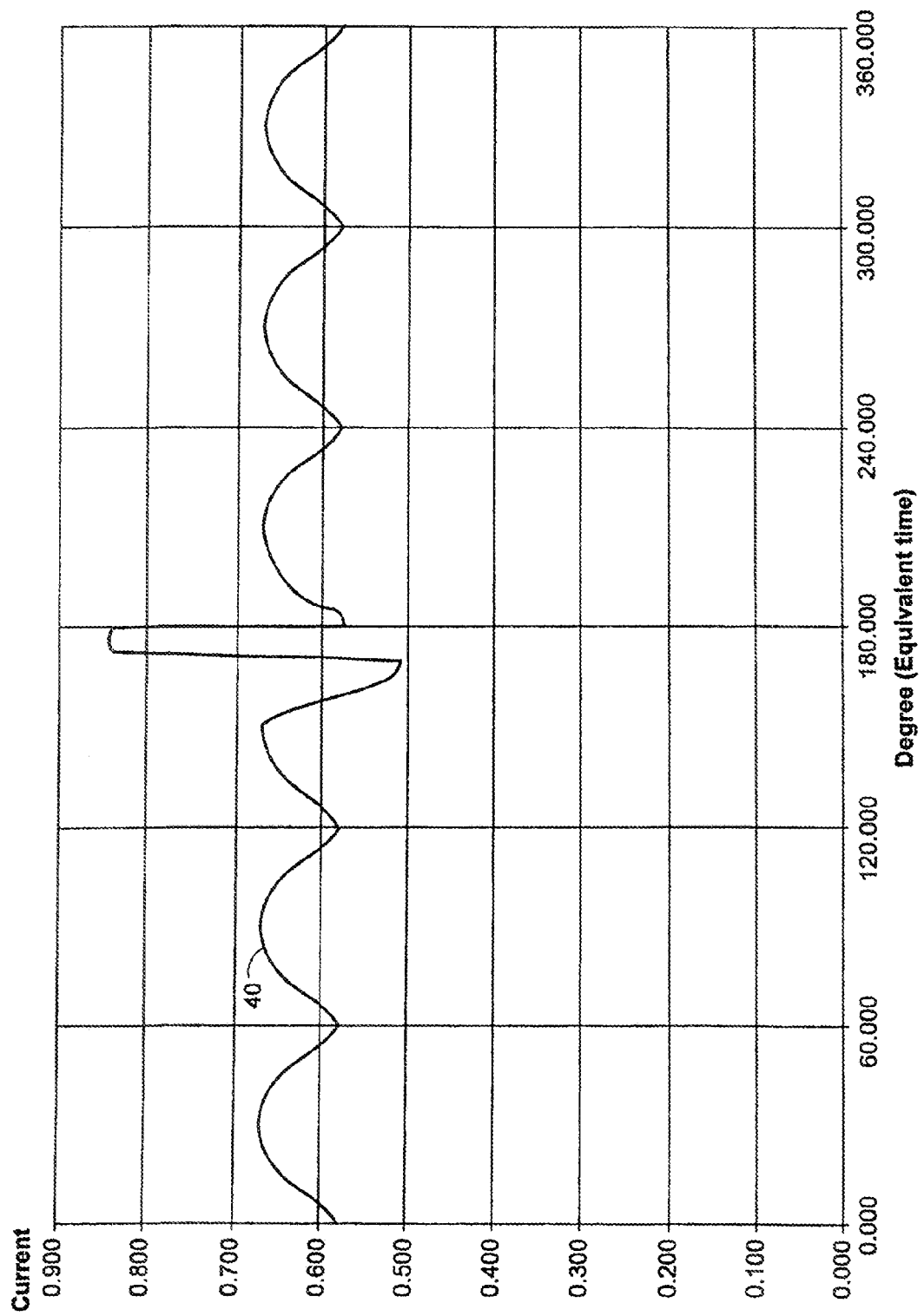
FIG. 4 is a graphical representation of the total current in the motor of FIG. 1 in sinusoidal mode without the present invention.

In either mode, these sharp current spikes cause spindle speed jitter and acoustic noise. Moreover, they increase the peak supply current. For example, FIG. 4 shows the normalized total motor current 40 (sum of phases A, B, C) in motor 10. As can be seen, during the $T_{freeze}$ period, the peak current is more than 25% higher than the current at any other time.

It has been found that this spiking of the motor current is at least partly the result of applying the full power supply voltage $V_{dd}$ across motor 10 during the $T_{freeze}$ period. However, if the voltage drop across motor 10 is reduced to a regulated voltage $V_{reg}$ at least during the $T_{freeze}$ period, the current spikes during the $T_{freeze}$ period can be substantially reduced.

It should be noted at this point that any of the three phases can be the phase that is tristated during the $T_{freeze}$ period, just as any of the phases can be the phase that is pulled high or pulled low during the $T_{freeze}$ period.

Without the present invention, the spindle motor currents in the different phases during the $T_{freeze}$ period (where phase B is the phase pulled high and phase C is the phase pulled low) may be given by:

$$I_{spb}=(V_{dd}-V_{bemf(spb)}-V_{ctap})/(R_{spb}+R_{ON(PMOS)}+SL_{spb})$$

$$I_{spc}=(V_{ctap}-V_{bemf(spc)})/(R_{spc}+R_{ON(NMOS)}+SL_{spc})$$

where:
$V_{ctap}=(V_{dd}/2)+V_{bemf(spa)}+V_{bemf(spb)}+V_{bemf(spc)}$,
$R_{spb}$ and $R_{spc}$ are the respective values of $R_{motor}$ 14 in phases B and C,
$R_{ON(Pmos)}$ and $R_{ON(NMOS)}$ are the respective values of the ON resistance of transistors in the respective phase drivers, and
$SL_{spb}$ and $SL_{spc}$ are the respective values of impedance $L_{motor}$ 15 in phases B and C.

With the present invention, the spindle motor currents in the different phases during the $T_{freeze}$ period (where phase B is the phase pulled high and phase C is the phase pulled low) may be given by:

$$I_{spb}=(V_{reg}-V_{bemf(spb)}-V_{ctap})/(R_{spb}+R_{ON(PMOS)}+SL_{spb})$$

$$I_{spc}=(V_{ctap}-V_{bemf(spc)})/(R_{spc}+R_{ON(NMOS)}+SL_{spc})$$

where:
$V_{ctap}=(V_{reg}/2)+V_{bemf(spa)}+V_{bemf(spb)}+V_{bemf(spc)}$, and
$V_{reg}$ is the regulated voltage during the $T_{freeze}$ period.

It is apparent that the denominators of all the expressions for the two cases are the same, while in the numerators, $V_{reg}$ is substituted for $V_{dd}$. The factor by which the current spikes are reduced can be approximated as $V_{reg}/V_{dd}$, assuming that the various $V_{bemf}$ terms are small compared to $V_{reg}$, which would depend on motor speed, and well as motor characteristics such as form factor and the nature of the motor windings.

Although the voltage drop across motor 10 is reduced from $V_{dd}$ to $V_{reg}$ only during the $T_{freeze}$ period, phase A preferably is already tristated for some period ahead of the $T_{freeze}$ period as well as during the $T_{freeze}$ period, and this longer period may be referred to as the "tristate period." Thus the only change that occurs during the $T_{freeze}$ period is the driving of phase B high and phase C low. This allows time for all transient effects of the tristating of phase A to settle out before the back-EMF measurement.

Preferably, $V_{reg}$ is chosen to approximate the average voltage across the motor during a power supply cycle, obtained by multiplying the supply voltage $V_{dd}$ by the duty cycle. In PWM trapezoidal mode, this is relatively straightforward. Motor speed is specified by the user, resulting in the setting of a value in the spindle DAC. For an n-bit spindle DAC, the maximum value is $2^n$, otherwise referred to as the spindle DAC range. The user motor speed setting is the spindle DAC value. The duty cycle is ratio of actual ON-time to maximum possible ON-time, which in PWM trapezoidal mode is equal to the ratio of the spindle DAC value to the spindle DAC range—i.e., SP_DAC/$2^n$, where SP_DAC is the value encoded by the spindle DAC. In other words, $V_{reg}=(V_{dd})$ (SP_DAC)/$2^n$.

Figure 5:
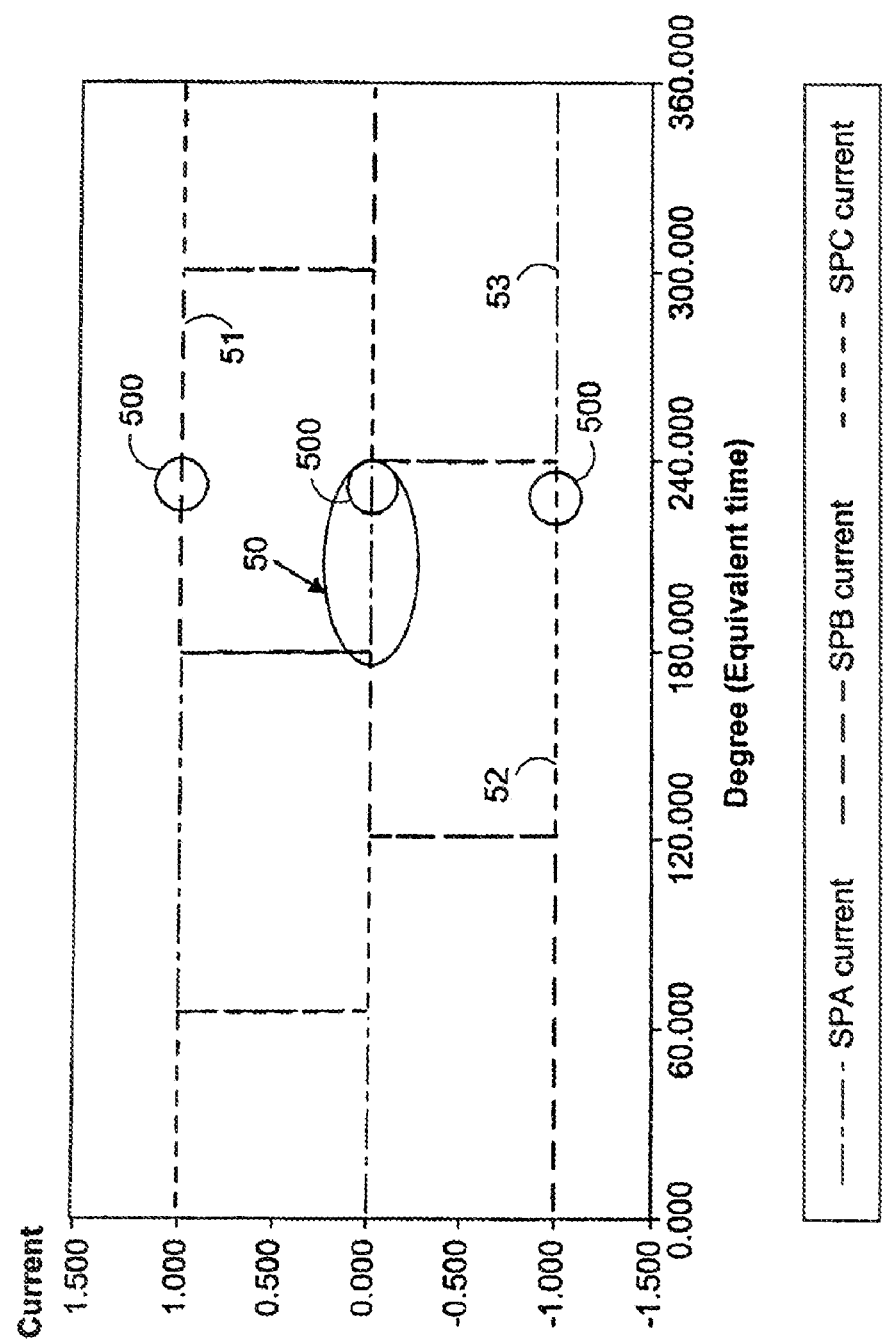
FIG. 5 is a graphical representation of current in the motor of FIG. 1 in trapezoidal drive mode with the present invention.

The resulting current (normalized) in the various phases is seen in FIG. 5, which is similar to FIG. 2. Trace 51 is a representation of an exemplary normalized trapezoidal current waveform in phase B, while trace 52 is a representation of an exemplary normalized trapezoidal current waveform in phase C. Ellipse 500 represents the tristate period of phase A (waveform 53), while circles 50 on all three waveforms represent the $T_{freeze}$ period. As can be seen, during that period there no detectable change in current waveform 51 (compare sharp positive spike 210 in current waveform 21 of FIG. 2), and no detectable change in current waveform 52 (compare sharp negative spike 220 in current waveform 22 of FIG. 2).

Approximating the average voltage across the motor during a power supply cycle in PWM sinusoidal mode is somewhat more complicated. Because the voltage varies over time, the duty cycle is equal to the ratio of the product of the spindle DAC value and a drive pattern (DP) to the spindle DAC range, where the drive pattern takes into account the time-varying nature of the waveform. Thus, duty cycle=(SP_DAC)(DP)/$2^n$, and $V_{reg}=(V_{dd})$ (SP_DAC) (DP)/$2^n$. DP is generally not a constant and may not even be linear. However, for purposes of approximating the average voltage, it is sufficient to assign to DP a constant value, preferably about 0.5. In order to compensate for the approximate nature of using a constant value for DP, preferably an adjustment is provided to allow users to fine-tune $V_{reg}$. In one preferred embodiment, this adjustment can be implemented by an offset DAC, which preferably is small, preferably having 5 or 6 bits. The value in the offset DAC will generally be the same for all motors of a particular model, unless motor parameters vary from motor to motor during manufacture.

Figure 6:
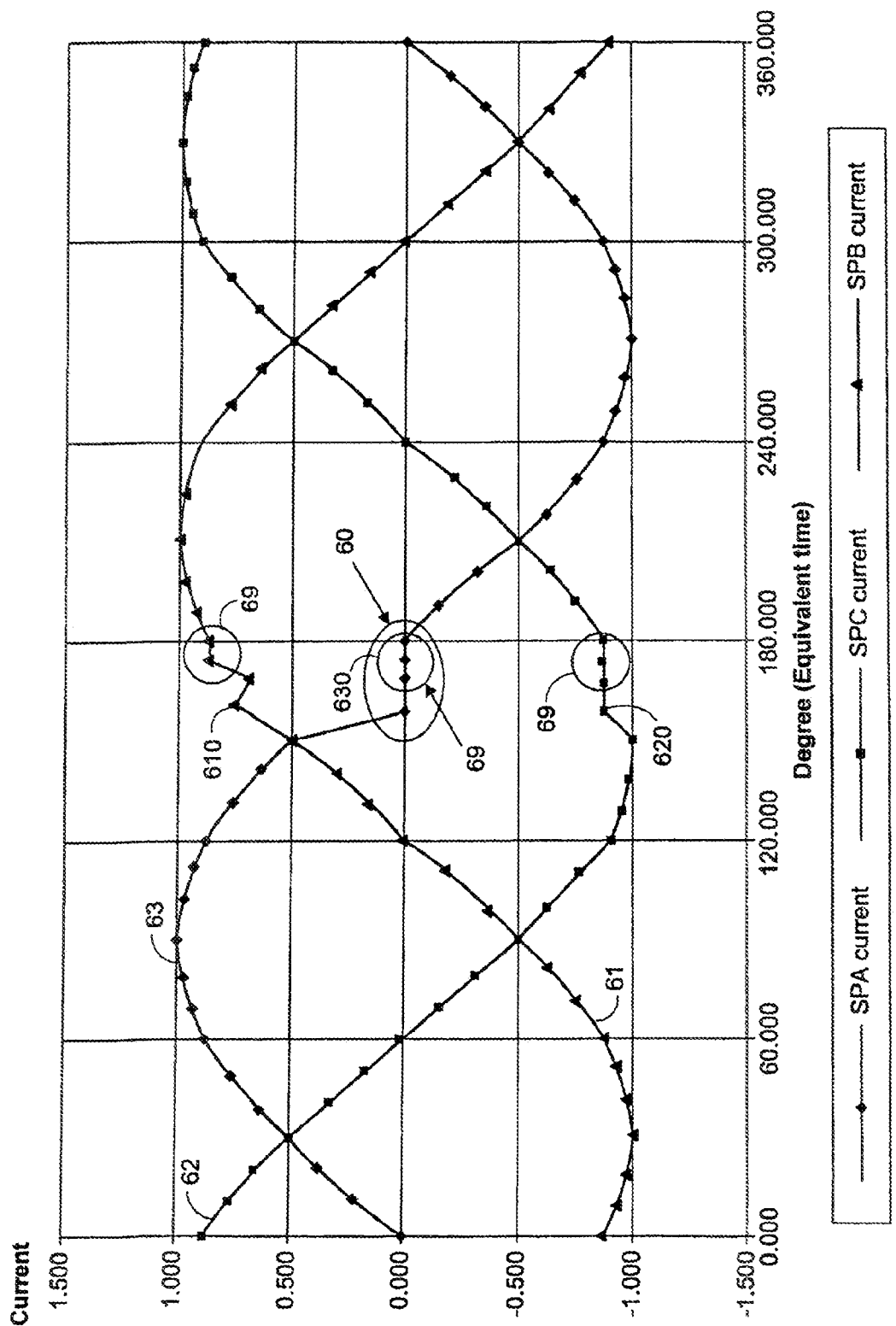
FIG. 6 is a graphical representation of current in the motor of FIG. 1 in sinusoidal drive mode with the present invention.

The resulting current (normalized) in the various phases is seen in FIG. 6, which is similar to FIG. 3. Trace 61 is a representation of an exemplary normalized sinusoidal current waveform in phase B, while trace 62 is a representation of an exemplary normalized sinusoidal current waveform in phase C. Circle 60 on phase A (waveform 63) represents the $T_{freeze}$, while ellipse 69 represents the tristate period. As can be seen, during those periods, whose starting times and durations preferably are programmable by the user—e.g., through firmware, there is only a minor deviation 610 of current waveform 61 from its sinusoidal form (compare sharp positive spike 310 in current waveform 31 of FIG. 3), and only a minor deviation 620 of current waveform 62 from its sinusoidal form (compare sharp negative spike 320 in current waveform 32 of FIG. 3). Of course, phase A is tristated so that waveform 63 does deviate from sinusoidal, assuming a flat zero-current state 630.

Figure 7:
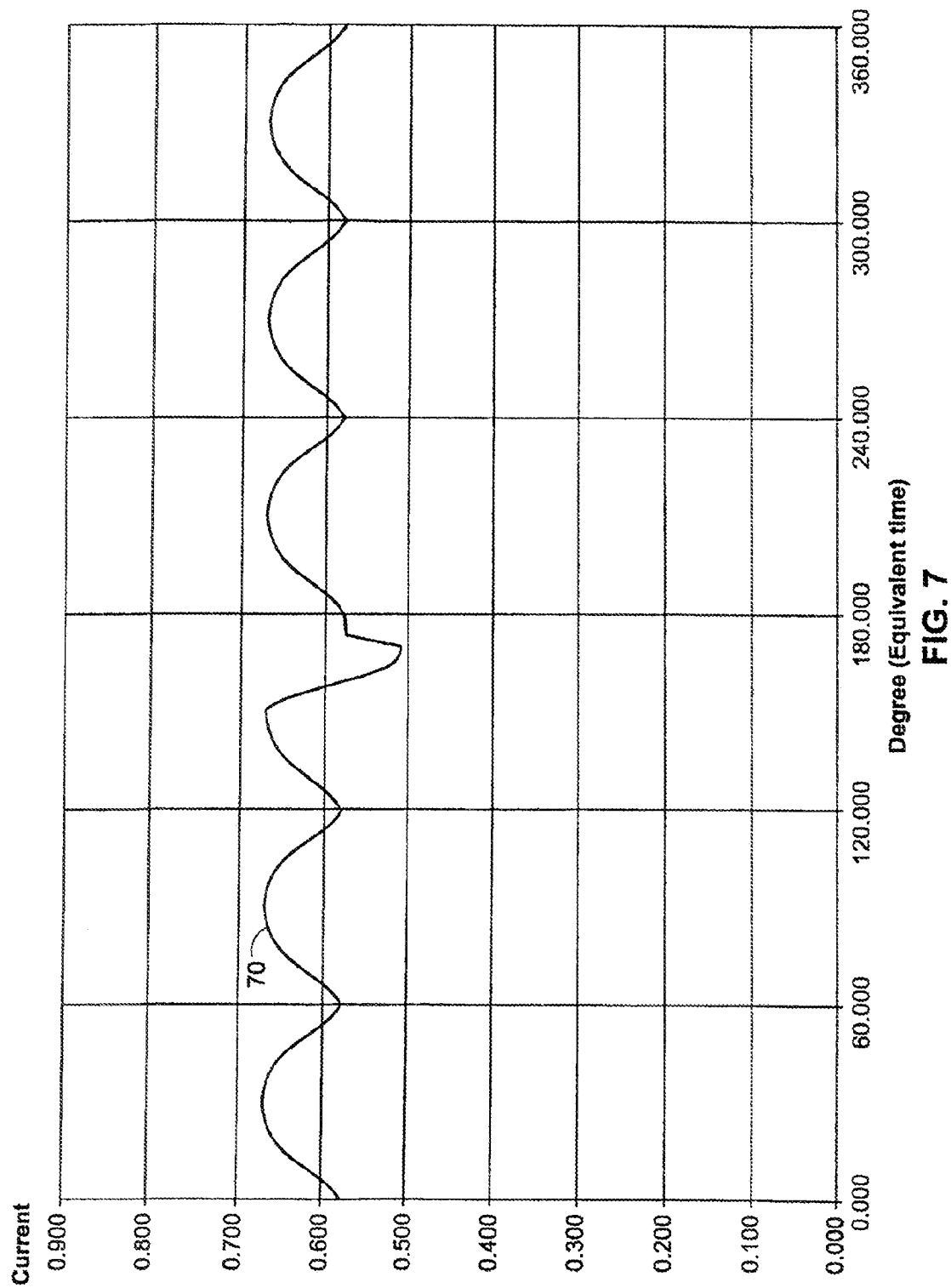
FIG. 7 is a graphical representation of the total current in the motor of FIG. 1 in sinusoidal mode with the present invention.

As seen in FIG. 7, the normalized total sinusoidal current 70 (sum of phases A, B, C) in motor 10 during the $T_{freeze}$ period barely deviates from its pattern during other parts of the operational cycle. The large increase in peak supply current seen in FIG. 4 is no longer present in FIG. 7.

What is important for purposes of this invention is that the total voltage drop across motor 10 be reduced during the $T_{freeze}$ period from a magnitude of $V_{dd}$ to a magnitude of $V_{reg}$. It does not matter whether the minimum voltage or the maximum voltage is adjusted. It is possible to lower the maximum voltage to some value $V_{dd}-\delta$ and to raise the minimum voltage to $V_{dd}-V_{reg}-\delta$. However, the most preferable cases are the case where the minimum voltage remains at ground while the maximum voltage is reduced to $V_{reg}$, and case where the maximum voltage is maintained at $V_{dd}$ while the minimum voltage is raised from ground to $V_{dd}-V_{reg}$. FIGS. 8-13 show motor drive circuitry that can be used to implement those two cases.

Figure 8:
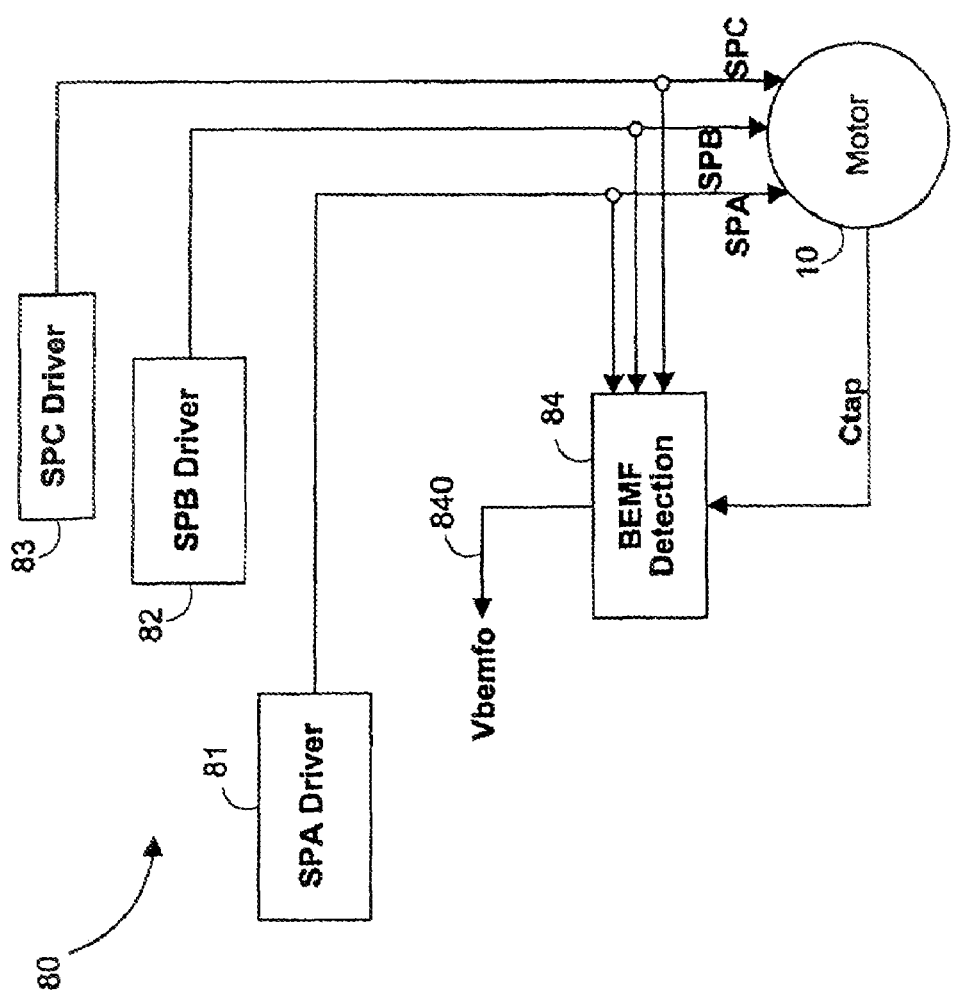
FIG. 8 is a schematic diagram of motor drive circuitry in accordance with the present invention.

As seen in FIG. 8, motor 10 is connected to motor drive circuitry 80 that includes separate drivers 81, 82, 83 for the three phases A, B and C respectively. Each of those drivers 81, 82, 83 is also connected to back-EMF detection circuitry 84, which also is connected to the central tap $C_{tap}$ 17 of motor 10, and which outputs a back-EMF voltage signal $V_{bemf0}$ 840.

Figure 9:
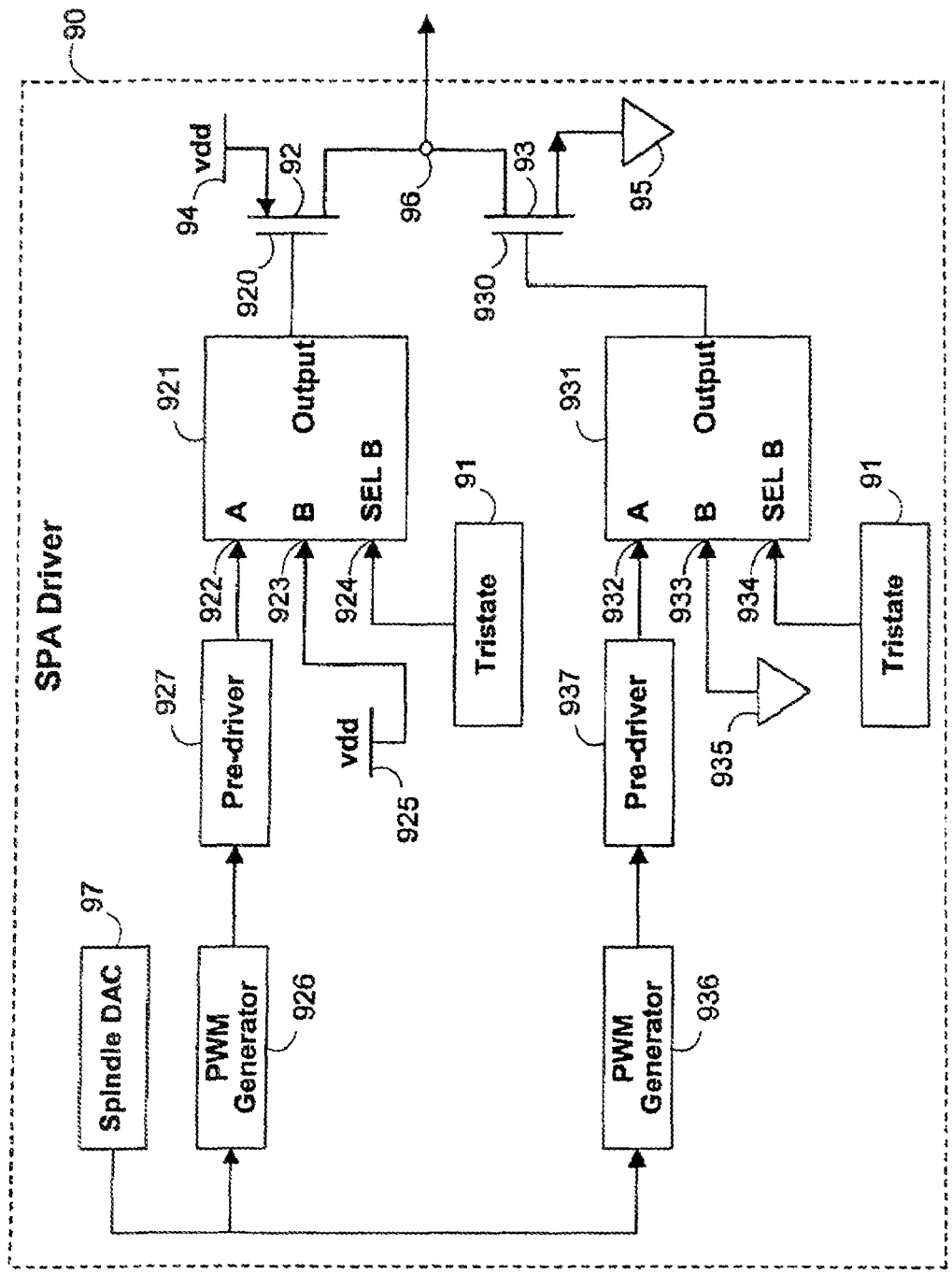
FIG. 9 is a schematic diagram of a drive circuit for a first phase of the motor of FIG. 1 in accordance with the present invention.
Figure 10:
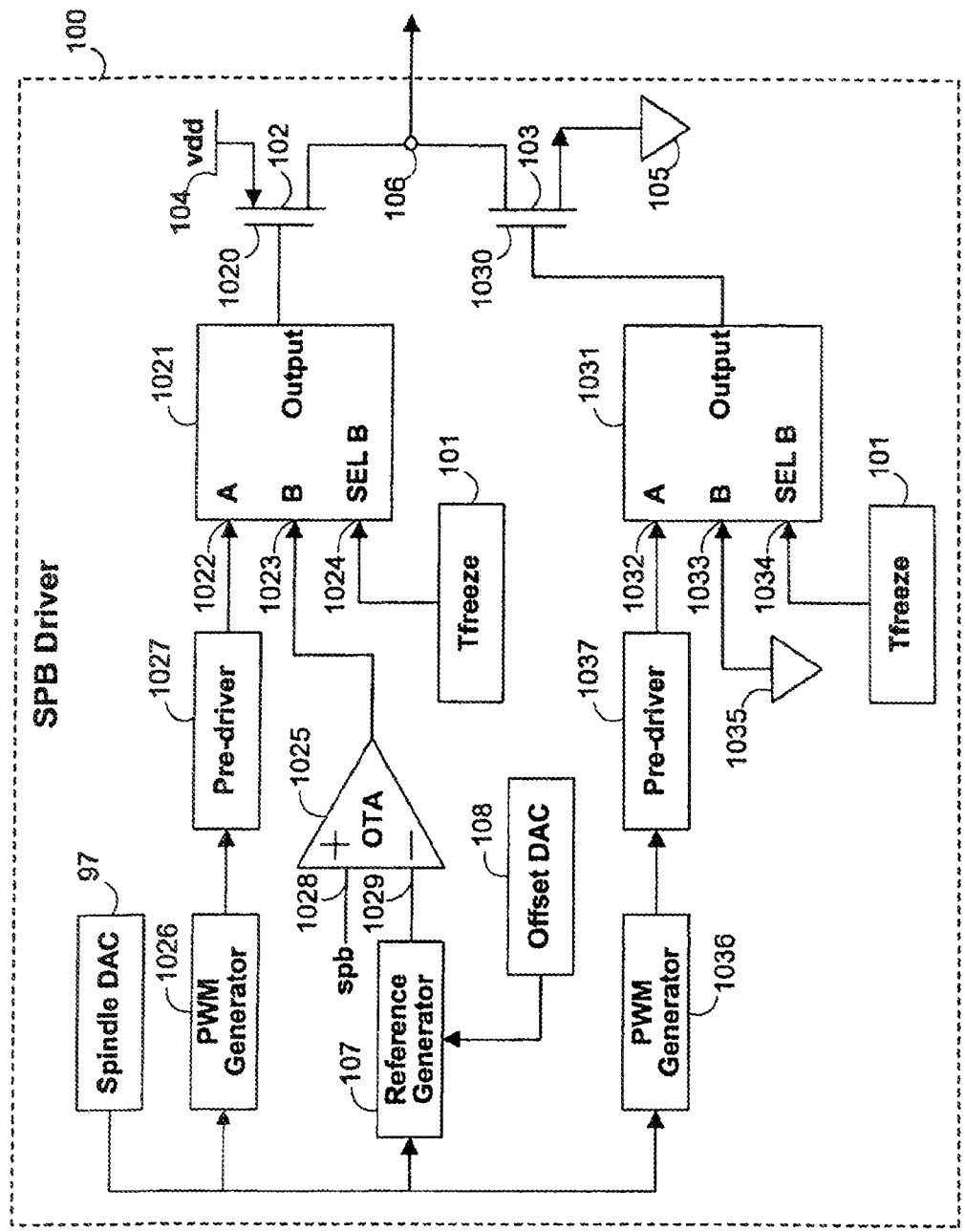
FIG. 10 is a schematic diagram of a drive circuit for a second phase of the motor of FIG. 1 in accordance with a first preferred embodiment of the present invention.
Figure 11:
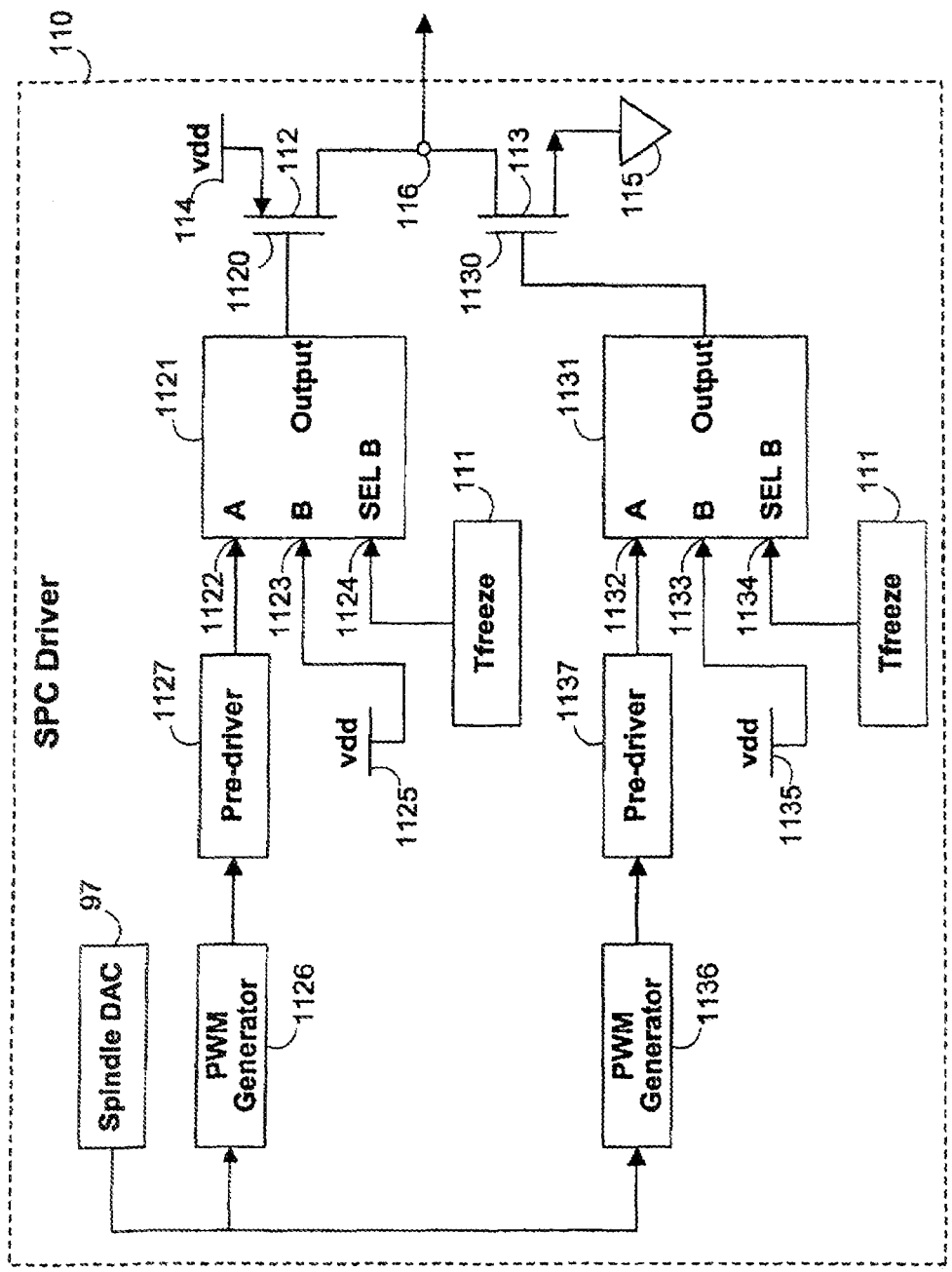
FIG. 11 is a schematic diagram of a drive circuit for a third phase of the motor of FIG. 1 in accordance with a first preferred embodiment of the present invention.

FIGS. 9-11 show preferred embodiments 90, 100, 110 of drivers 81, 82, 83 for the implementation where the minimum voltage remains at ground while the maximum voltage is reduced to $V_{reg}$.

FIG. 9 shows a preferred embodiment 90 of a driver 81 for phase A, which tristates phase A during the tristate period, as signalled by the application of a tristate signal 91. Driver 90 preferably includes a PMOS transistor 92 in series with an NMOS transistor 93 between the supply voltage $V_{dd}$ 94 and ground 95. The output of driver 90 is node 96 between transistors 92, 93.

The gate 920 of PMOS transistor 92 is connected to the output of a multiplexer 921, having two inputs 922, 923 and a control input 924 on which the tristate signal 91 can be asserted during the tristate period to select input 923, which is connected to supply voltage $V_{dd}$ 925. When tristate signal 91 is not asserted, multiplexer 921 selects input 922, to which is connected PWM generator 926 and pre-driver 927, which receive input from spindle DAC 97.

The gate 930 of NMOS transistor 93 is connected to the output of a multiplexer 931, having two inputs 932, 933 and a control input 934 on which the tristate signal 91 can be asserted during the tristate period to select input 933, which is connected to ground 935. When tristate signal 91 is not asserted, multiplexer 931 selects input 932, to which is connected PWM generator 936 and pre-driver 937, which receive input from spindle DAC 97.

It can be seen that when tristate signal 91 is not asserted, multiplexers 921, 931 output the respective PWM signals generated by PWM generators 926, 936 and pre-drivers 927, 937 to drive motor 10 in accordance with the speed determined by the user setting in spindle DAC 97. However, when tristate signal 91 is asserted, multiplexer 921 outputs supply voltage $V_{dd}$ 925, turning off PMOS transistor 92 and disconnecting output node 96 from supply voltage $V_{dd}$ 94. Similarly, multiplexer 931 outputs ground 935, turning off NMOS transistor 93 and disconnecting output node 96 from ground. Thus, during the tristate period, output node 96 is disconnected both from supply voltage $V_{dd}$ 94 and from ground 95—i.e., it is tristated, as expected.

FIG. 10 shows a preferred embodiment 100 of a driver 82 for phase B, which drives phase B high during the $T_{freeze}$ period, as signalled by the application of a $T_{freeze}$ signal 101. Driver 100 preferably includes a PMOS transistor 102 in series with an NMOS transistor 103 between the supply voltage $V_{dd}$ 104 and ground 105. The output of driver 100 is node 106 between transistors 102, 103.

The gate 1020 of PMOS transistor 102 is connected to the output of a multiplexer 1021, having two inputs 1022, 1023 and a control input 1024 on which the $T_{freeze}$ signal 101 can be asserted during the $T_{freeze}$ period to select input 1023, which is connected to output transconductance amplifier OTA 1025. When $T_{freeze}$ signal 101 is not asserted, multiplexer 1021 selects input 1022, to which is connected PWM generator 1026 and pre-driver 1027, which receive input from spindle DAC 97.

The gate 1030 of NMOS transistor 103 is connected to the output of a multiplexer 1031, having two inputs 1032, 1033 and a control input 1034 on which the $T_{freeze}$ signal 101 is asserted during the $T_{freeze}$ period to select input 1033, which is connected to ground 1035. When $T_{freeze}$ signal 101 is not asserted, multiplexer 1031 selects input 1032, to which is connected PWM generator 1036 and pre-driver 1037, which receive input from spindle DAC 97.

It can be seen that when $T_{freeze}$ signal 101 is not asserted, multiplexers 1021, 1031 output the respective PWM signals generated by PWM generators 1026, 1036 and pre-drivers 1027, 1037 to drive motor 10 in accordance with the speed determined by the user setting in spindle DAC 97. However, when $T_{freeze}$ signal 101 is asserted, multiplexer 1031 outputs ground 1035, turning off NMOS transistor 103 and disconnecting output node 106 from ground 105. Similarly, multiplexer 1021 outputs the output of OTA 1025, driving PMOS transistor 102. The output of OTA 1025 is regulated to avoid turning on PMOS transistor 102 so strongly that output 106 is $V_{dd}$, and instead turning on PMOS transistor 102 only strongly enough that output 106 is $V_{reg} < V_{dd}$. This is accomplished by feeding back output 106 to input 1028 of OTA 1026. The other input 1029 receives the output of reference generator 107, which itself receives the output of spindle DAC 97 which determines the duty cycle used to determine $V_{reg}$ as discussed above. This feedback keeps output 106 from exceeding $V_{reg}$. As discussed above, offset DAC 108 is provided to allow fine-tuning of $V_{reg}$ by the user, if necessary. Thus, during the $T_{freeze}$ period, output node 106 is driven to $V_{reg}$ as desired.

Phase B output 106 is the upper limit of the voltage drop across motor 10 during the $T_{freeze}$ period. The lower limit of the voltage drop across motor 10 during the $T_{freeze}$ period is output 116 of phase C driver 110, shown in FIG. 11. Driver 110 preferably includes a PMOS transistor 112 in series with an NMOS transistor 113 between the supply voltage $V_{dd}$ 114 and ground 115. The output of driver 110 is node 116 between transistors 112, 113.

The gate 1120 of PMOS transistor 112 is connected to the output of a multiplexer 1121, having two inputs 1122, 1123 and a control input 1124 on which the $T_{freeze}$ signal 111 can be asserted during the $T_{freeze}$ period to select input 1123, which is connected to supply voltage $V_{dd}$ 1125. When $T_{freeze}$ signal 111 is not asserted, multiplexer 1121 selects input 1122, to which is connected PWM generator 1126 and pre-driver 1127, which receive input from spindle DAC 97.

The gate 1130 of NMOS transistor 113 is connected to the output of a multiplexer 1131, having two inputs 1132, 1133 and a control input 1134 on which the $T_{freeze}$ signal 111 can be asserted during the $T_{freeze}$ period to select input 1133, which is connected to supply voltage $V_{dd}$ 1135. When $T_{freeze}$ signal 111 is not asserted, multiplexer 1131 selects input 1132, to which is connected PWM generator 1136 and pre-driver 1137, which receive input from spindle DAC 97.

It can be seen that when $T_{freeze}$ signal 111 is not asserted, multiplexers 1121, 1131 output the respective PWM signals generated by PWM generators 1126, 1136 and pre-drivers 1127, 1137 to drive motor 10 in accordance with the speed determined by the user setting in spindle DAC 97. However, when $T_{freeze}$ signal 111 is asserted, multiplexer 1121 outputs supply voltage $V_{dd}$ 1125, turning off PMOS transistor 112 and disconnecting output node 116 from supply voltage $V_{dd}$ 114. Similarly, multiplexer 1131 outputs supply voltage $V_{dd}$ 1135, turning on NMOS transistor 113 and connecting output node 116 to ground 115. Thus, during the $T_{freeze}$ period, output node 116 is driven to ground 115, as expected.

Thus, in the implementation shown in FIGS. 9-11, phase A is tristated during the tristate period, and during the $T_{freeze}$ period, phase C is grounded while phase B is regulated to $V_{reg} < V_{dd}$, so that the voltage drop across motor 10 is $V_{reg}$ as desired.

Figure 12:
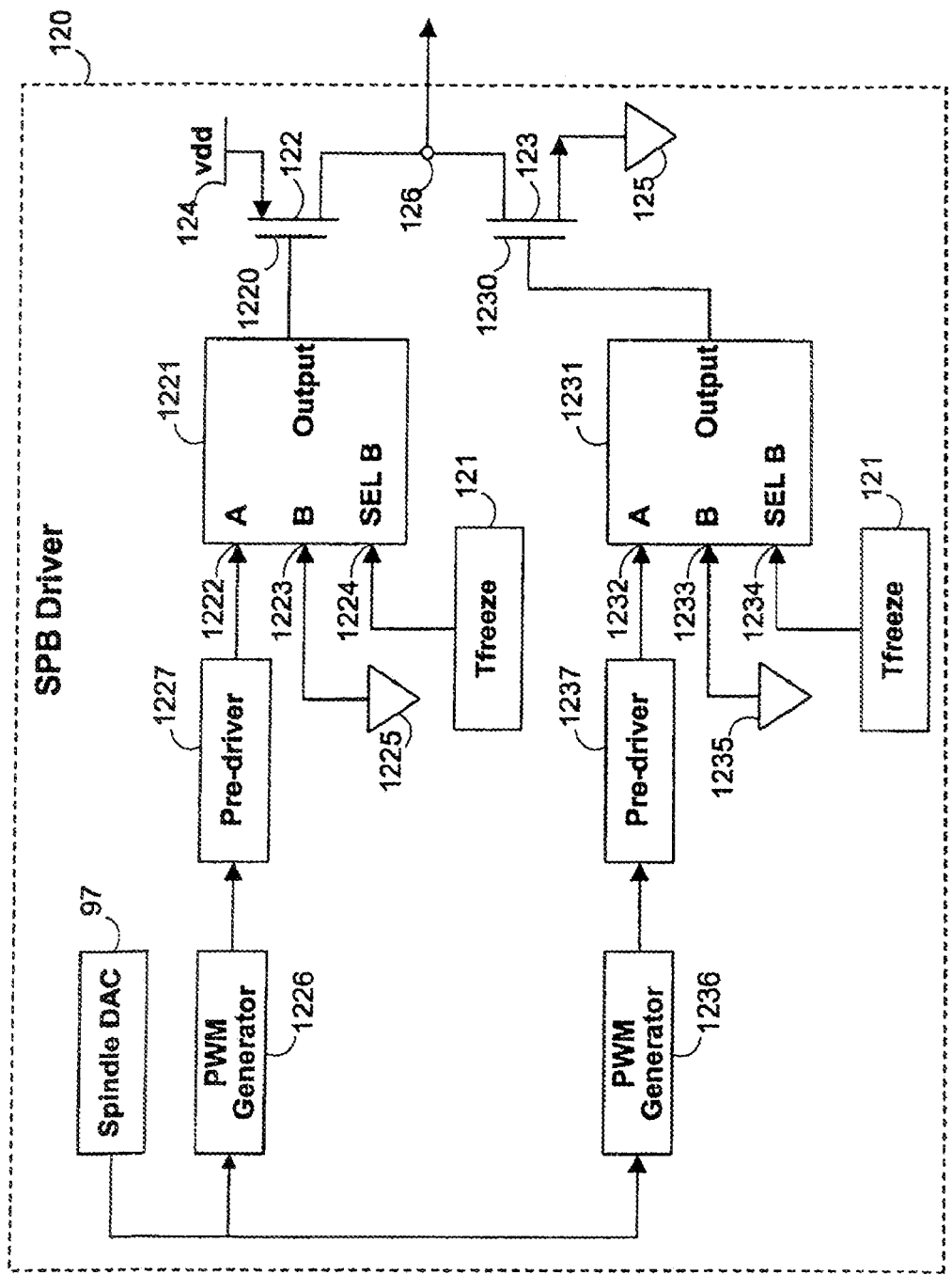
FIG. 12 is a schematic diagram of a drive circuit for a second phase of the motor of FIG. 1 in accordance with a second preferred embodiment of the present invention.
Figure 13:
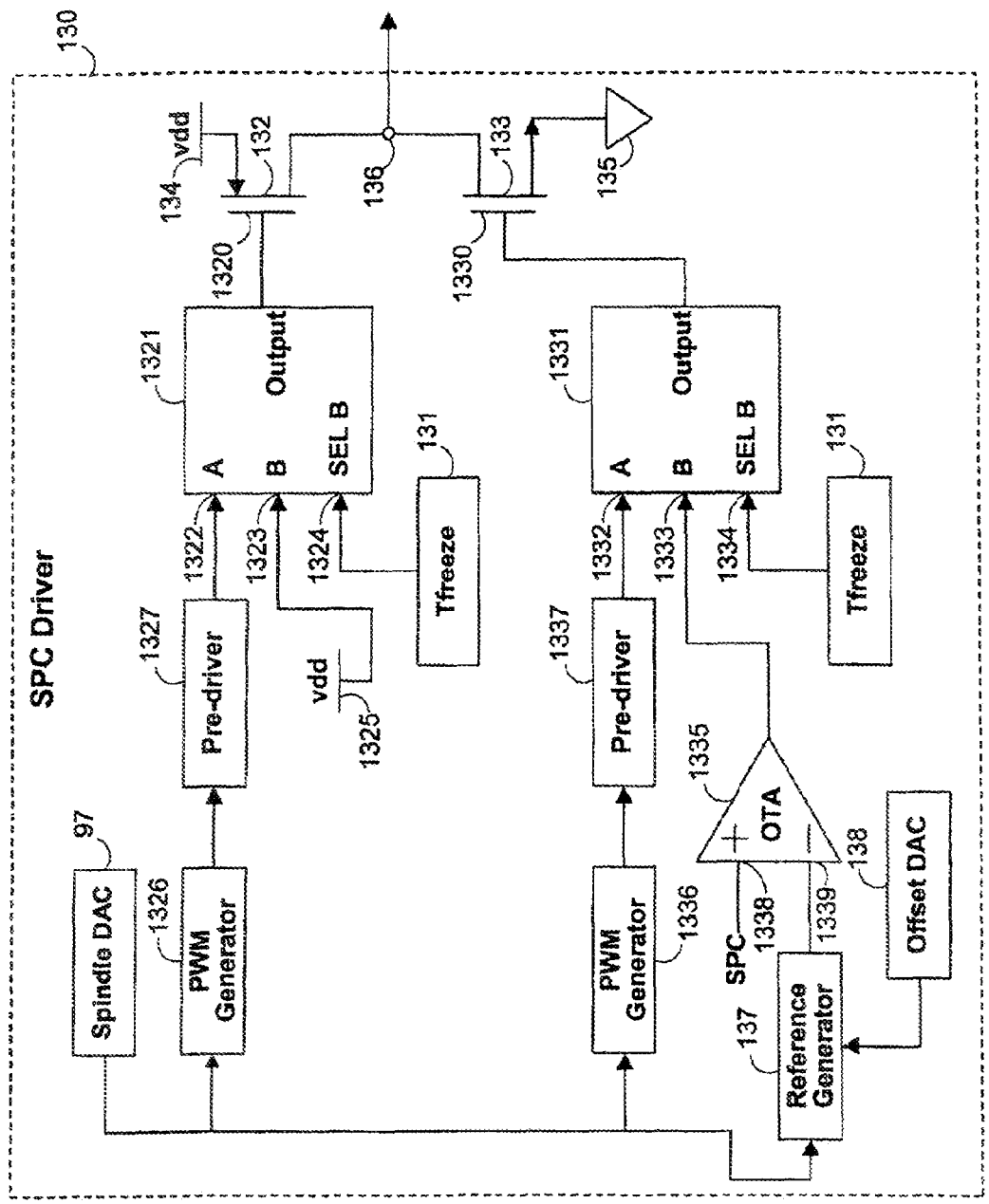
FIG. 13 is a schematic diagram of a drive circuit for a third phase of the motor of FIG. 1 in accordance with a second preferred embodiment of the present invention.

FIGS. 12 and 13 show preferred embodiments 120, 130, of drivers 82, 83 for the implementation where the maximum voltage remains at $V_{dd}$ while the minimum voltage is raised above ground to $V_{dd} - V_{reg}$. In this implementation, embodiment 90 of driver 81 (FIG. 9) may be used as it is in the implementation where the minimum voltage remains at ground while the maximum voltage is reduced to $V_{reg}$.

In this implementation, the upper limit of the voltage drop across motor 10 during the $T_{freeze}$ period is output 126 of phase B driver 120, shown in FIG. 12. Driver 120 preferably includes a PMOS transistor 122 in series with an NMOS transistor 123 between the supply voltage $V_{dd}$ 124 ground 125. The output of driver 120 is node 126 between transistors 122, 123.

The gate 1220 of PMOS transistor 122 is connected to the output of a multiplexer 1221, having two inputs 1222, 1223 and a control input 1224 on which the $T_{freeze}$ signal 121 can be asserted during the $T_{freeze}$ period to select input 1223, which is connected to ground 1225. When $T_{freeze}$ signal 121 is not asserted, multiplexer 1221 selects input 1222, to which is connected PWM generator 1226 and pre-driver 1227, which receive input from spindle DAC 97.

The gate 1230 of NMOS transistor 123 is connected to the output of a multiplexer 1231, having two inputs 1232, 1233 and a control input 1234 on which the $T_{freeze}$ signal 121 can be asserted during the $T_{freeze}$ period to select input 1233, which is connected to ground 1235. When $T_{freeze}$ signal 121 is not asserted, multiplexer 1231 selects input 1232, to which is connected PWM generator 1236 and pre-driver 1237, which receive input from spindle DAC 97.

It can be seen that when $T_{freeze}$ signal 121 is not asserted, multiplexers 1221, 1231 output the respective PWM signals generated by PWM generators 1226, 1236 and pre-drivers 1227, 1237 to drive motor 10 in accordance with the speed determined by the user setting in spindle DAC 97. However, when $T_{freeze}$ signal 121 is asserted, multiplexer 1221 outputs ground 1125, turning on PMOS transistor 122 and connecting output node 126 to supply voltage $V_{dd}$ 124. Similarly, multiplexer 1231 outputs ground 1135, turning off NMOS transistor 123 and disconnecting output node 126 from ground 125. Thus, during the $T_{freeze}$ period, output node 126 is driven to supply voltage $V_{dd}$ 124, as expected.

Phase B output 126 is the upper limit of the voltage drop across motor 10 during the $T_{freeze}$ period. The lower limit of the voltage drop across motor 10 during the $T_{freeze}$ period is output 136 of phase C driver 130, shown in FIG. 13. Driver 130 preferably includes a PMOS transistor 132 in series with an NMOS transistor 133 between the supply voltage $V_{dd}$ 134 and ground 135. The output of driver 130 is node 136 between transistors 132, 133.

The gate 1320 of PMOS transistor 132 is connected to the output of a multiplexer 1321, having two inputs 1322, 1323 and a control input 1324 on which the $T_{freeze}$ signal 131 can be asserted during the $T_{freeze}$ period to select input 1323, which is connected to supply voltage $V_{dd}$ 1325. When $T_{freeze}$ signal 131 is not asserted, multiplexer 1321 selects input 1322, to which is connected PWM generator 1326 and pre-driver 1327, which receive input from spindle DAC 97.

The gate 1330 of NMOS transistor 133 is connected to the output of a multiplexer 1331, having two inputs 1332, 1333 and a control input 1334 on which the $T_{freeze}$ signal 131 can be asserted during the $T_{freeze}$ period to select input 1333, which is connected to output transconductance amplifier OTA 1335. When $T_{freeze}$ signal 131 is not asserted, multiplexer 1331 selects input 1332, to which is connected PWM generator 1336 and pre-driver 1337, which receive input from spindle DAC 97.

It can be seen that when $T_{freeze}$ signal 131 is not asserted, multiplexers 1321, 1331 output the respective PWM signals generated by PWM generators 1326, 1336 and pre-drivers 1327, 1337 to drive motor 10 in accordance with the speed determined by the user setting in spindle DAC 97. However, when $T_{freeze}$ signal 131 is asserted, multiplexer 1321 outputs supply voltage $V_{dd}$ 1325, turning off PMOS transistor 132 and disconnecting output node 136 from supply voltage $V_{dd}$ 134. Similarly, multiplexer 1331 outputs the output of OTA 1335, driving NMOS transistor 133. The output of OTA 1335 is regulated to avoid turning on NMOS transistor 133 so strongly that output 136 is ground, and instead turning on NMOS transistor 133 only strongly enough that output 136 is pulled down to $V_{dd}-V_{reg}>0$. This is accomplished by feeding back output 136 to input 1338 of OTA 1335. The other input 1339 receives the output of reference generator 137, which itself receives the output of spindle DAC 96 which determines the duty cycle used to determine $V_{reg}$ as discussed above. This feedback keeps output 136 from falling below $V_{dd}-V_{reg}$. As discussed above, offset DAC 138 is provided to allow fine-tuning of $V_{reg}$ by the user, if necessary. Thus, during the $T_{freeze}$ period, output node 136 is driven to $V_{dd}-V_{reg}$ as desired.

Thus, in the implementation shown in FIGS. 9, 12 and 13, phase A is tristated during the tristate period, and during the $T_{freeze}$ period, phase B is pulled to $V_{dd}$ while phase C is regulated to $V_{dd}-V_{reg}$ so that the voltage drop across motor 10 is $V_{reg}$ as desired.

Thus it is seen that a method and apparatus for minimizing current variations in the phases of a motor power supply during back-EMF detection, allowing more accurate control of the speed of a motor, particularly in a disk drive, has been provided.

Figure 14:
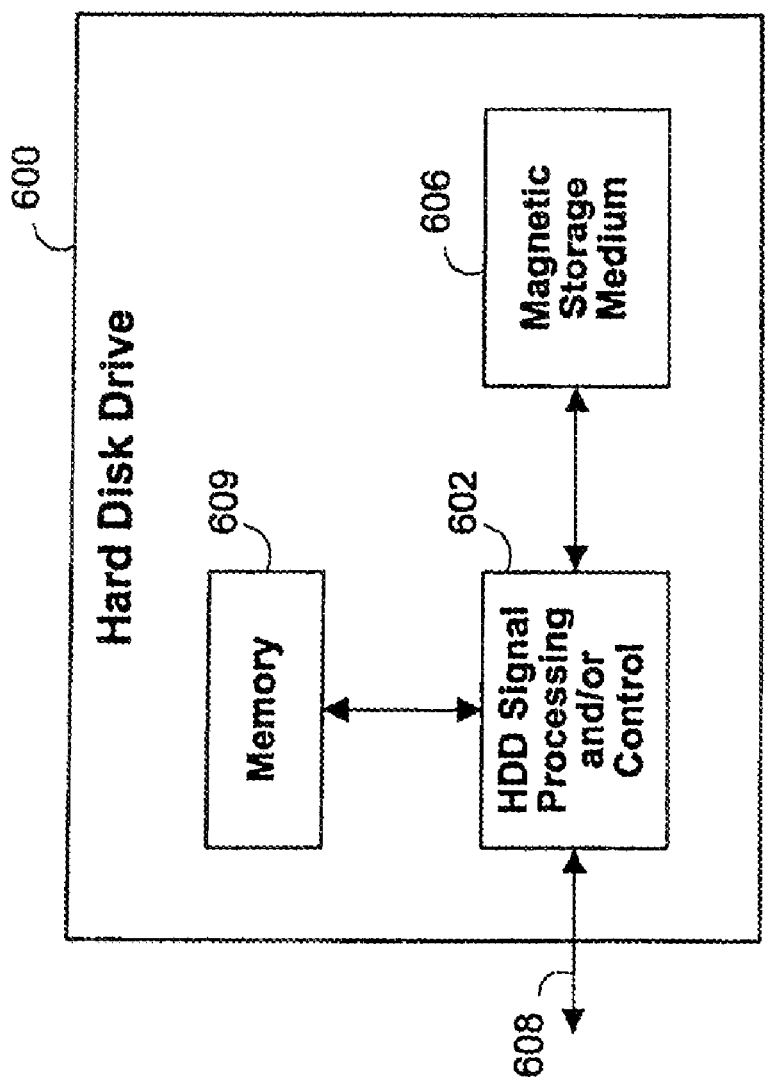
FIG. 14 is a block diagram of an exemplary hard disk drive that can employ the disclosed technology.
Figure 15:
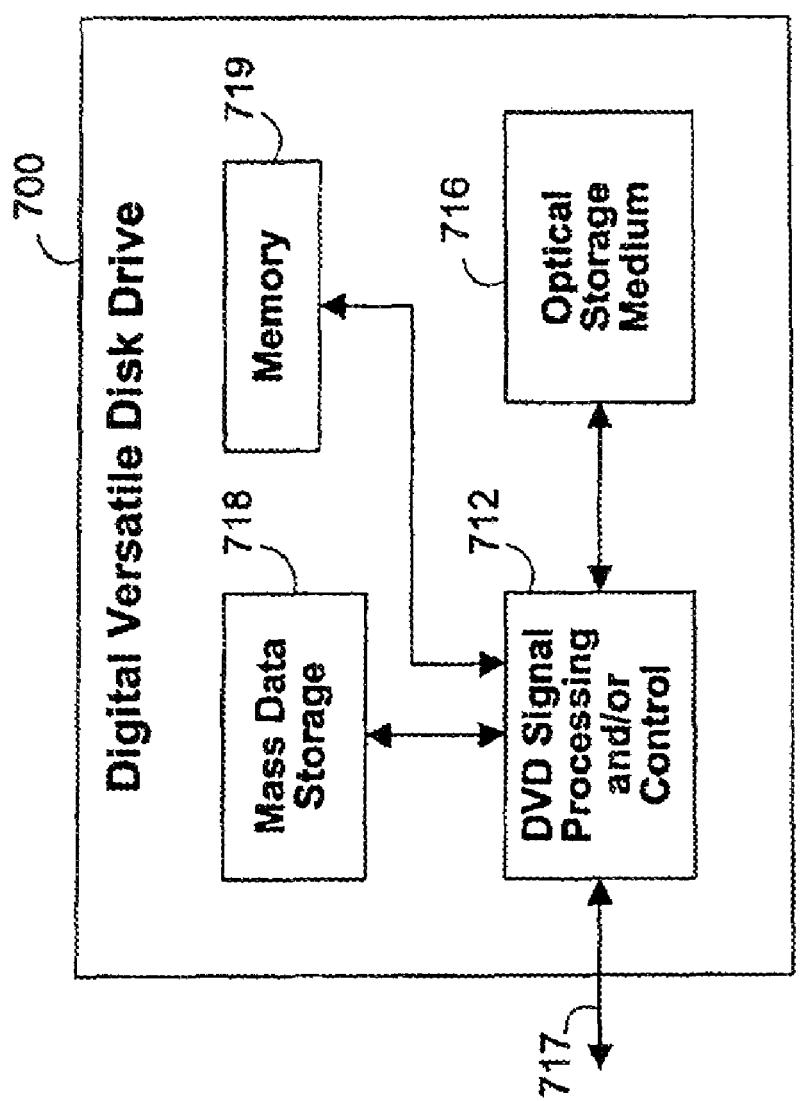
FIG. 15 is a block diagram of an exemplary digital versatile disc that can employ the disclosed technology.

Referring now to FIGS. 14 and 15, two exemplary implementations of the present invention are shown.

Referring now to FIG. 14 the present invention can be implemented in a hard disk drive 600. The present invention may implement either or both signal processing and/or control circuits, which are generally identified in FIG. 14 at 602. In some implementations, the signal processing and/or control circuit 602 and/or other circuits (not shown) in the HDD 600 may process data, perform coding and/or encryption, perform calculations, and/or format data that is output to and/or received from a magnetic storage medium 606.

The HDD 600 may communicate with a host device (not shown) such as a computer, mobile computing devices such as personal digital assistants, cellular telephones, media or MP3 players and the like, and/or other devices, via one or more wired or wireless communication links 608. The HDD 600 may be connected to memory 609 such as random access memory (RAM), low latency nonvolatile memory such as flash memory, read only memory (ROM) and/or other suitable electronic data storage.

Referring now to FIG. 15 the present invention can be implemented in a digital versatile disk (DVD) drive 700. The present invention may implement either or both signal processing and/or control circuits, which are generally identified in FIG. 15 at 712, and/or mass data storage of the DVD drive 700. The signal processing and/or control circuit 712 and/or other circuits (not shown) in the DVD drive 700 may process data, perform coding and/or encryption, perform calculations, and/or format data that is read from and/or data written to an optical storage medium 716. In some implementations, the signal processing and/or control circuit 712 and/or other circuits (not shown) in the DVD drive 700 can also perform other functions such as encoding and/or decoding and/or any other signal processing functions associated with a DVD drive.

DVD drive 700 may communicate with an output device (not shown) such as a computer, television or other device, via one or more wired or wireless communication links 717. The DVD drive 700 may communicate with mass data storage 718 that stores data in a nonvolatile manner. The mass data storage 718 may include a hard disk drive (HDD). The HDD may have the configuration shown in FIG. 14 The HDD may be a mini-HDD that includes one or more platters having a diameter that is smaller than approximately 1.8". The DVD drive 700 may be connected to memory 719 such as RAM, ROM, low-latency nonvolatile memory such as flash memory, and/or other suitable electronic data storage.

Figure 16:
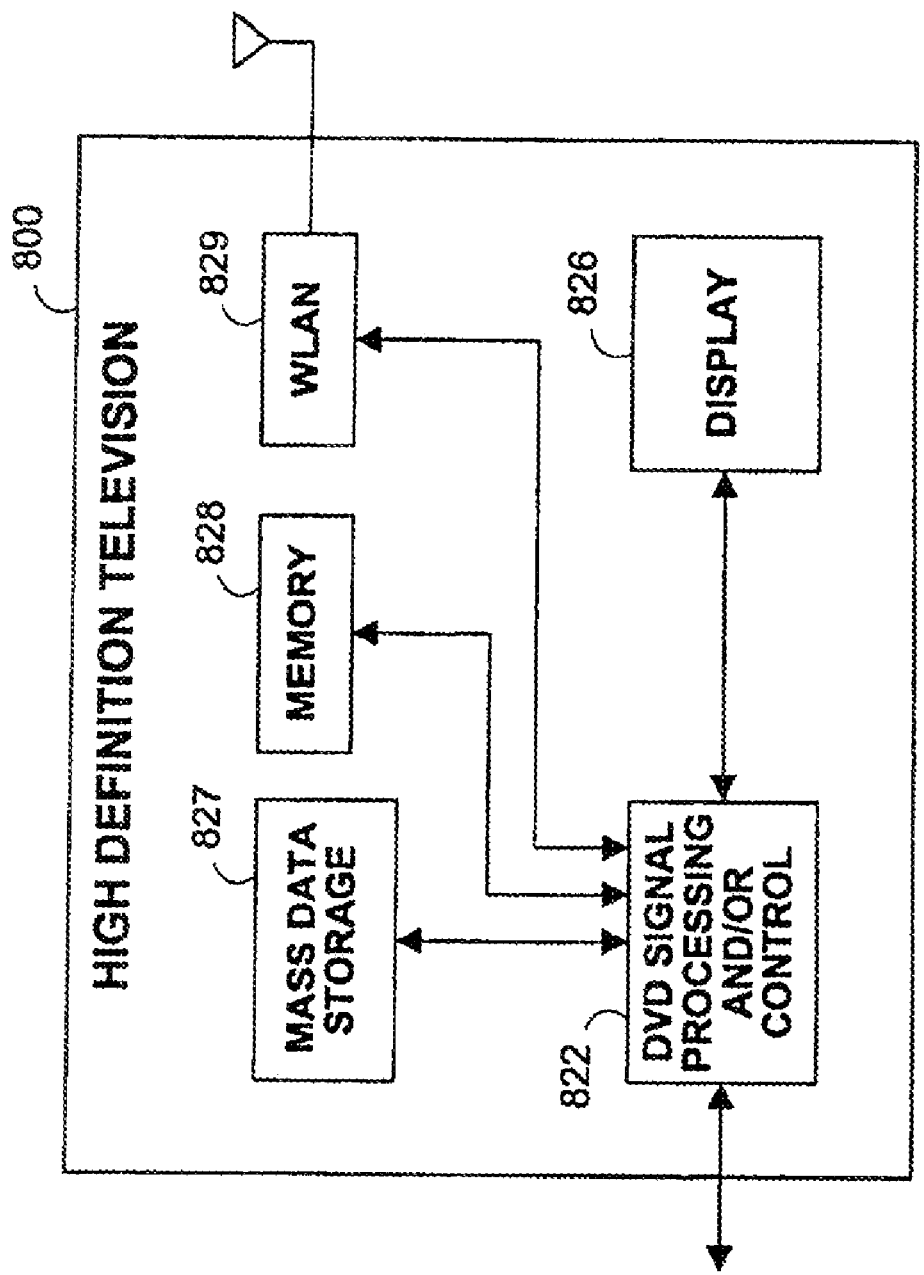
FIG. 16 is a block diagram of an exemplary high definition television that can employ the disclosed technology.

Referring now to FIG. 16, the present invention can be implemented in a high definition television (HDTV) 800. The present invention may implement either or both signal processing and/or control circuits, which are generally identified in FIG. 16 at 822, a WLAN interface and/or mass data storage of the HDTV 800. The HDTV 800 receives HDTV input signals in either a wired or wireless format and generates HDTV output signals for a display 826. In some implementations, signal processing circuit and/or control circuit 822 and/or other circuits (not shown) of the HDTV 820 may process data, perform coding and/or encryption, perform calculations, format data and/or perform any other type of HDTV processing that may be required.

The HDTV 800 may communicate with mass data storage 827 that stores data in a nonvolatile manner such as optical and/or magnetic storage devices. At least one HDD may have the configuration shown in FIG. 14 and/or at least one DVD drive may have the configuration shown in FIG. 15. The HDD may be a mini-HDD that includes one or more platters having a diameter that is smaller than approximately 1.8". The HDTV 800 may be connected to memory 1028 such as RAM, ROM, low-latency nonvolatile memory such as flash memory, and/or other suitable electronic data storage. The HDTV 800 also may support connections with a WLAN via a WLAN network interface 829.

Figure 17:
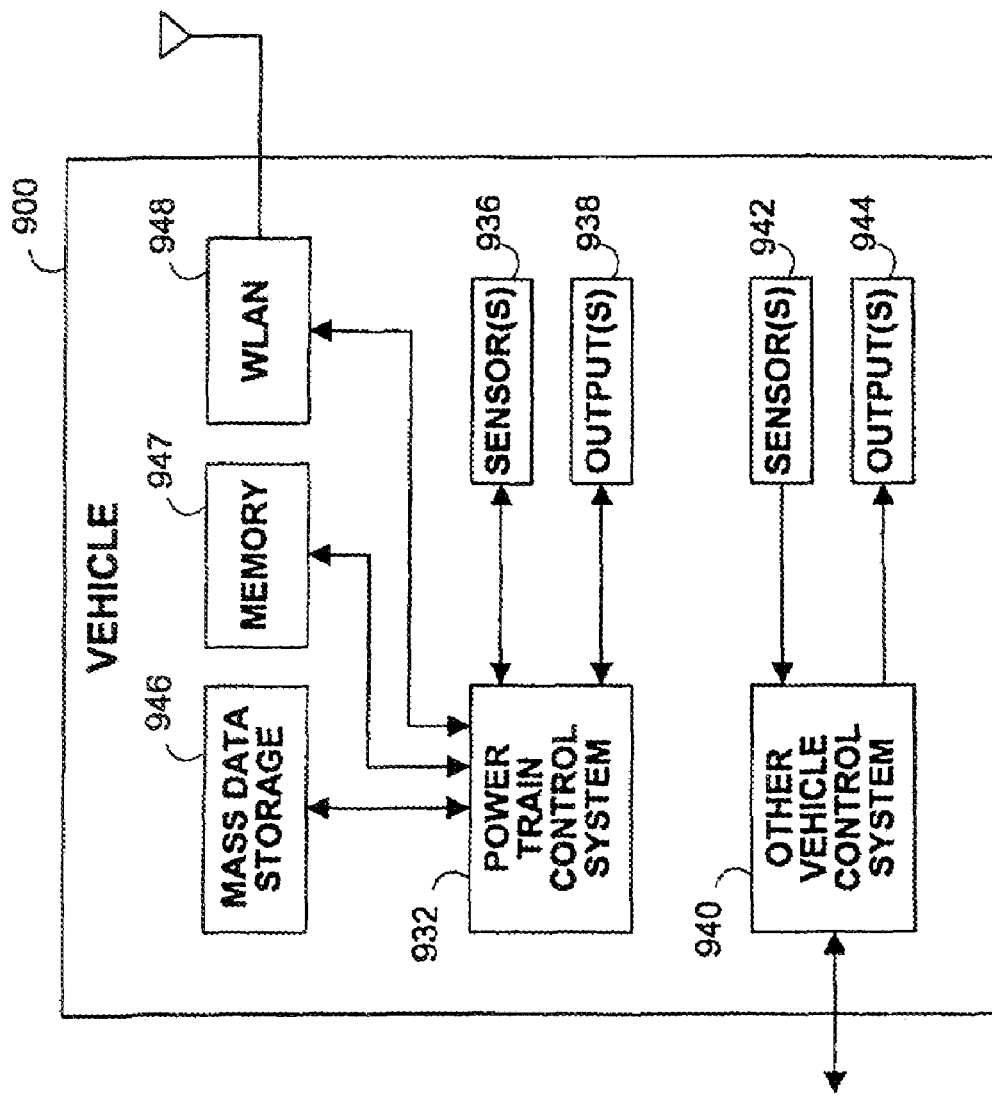
FIG. 17 is a block diagram of an exemplary vehicle that can employ the disclosed technology.

Referring now to FIG. 17, the present invention implements a control system of a vehicle 900, a WLAN interface and/or mass data storage of the vehicle control system. In some implementations, the present invention may implement a powertrain control system 932 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 940 of the vehicle 900. The control system 940 may likewise receive signals from input sensors 942 and/or output control signals to one or more output devices 944. In some implementations, the control system 940 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 932 may communicate with mass data storage 946 that stores data in a nonvolatile manner. The mass data storage 946 may include optical and/or magnetic storage devices for example hard disk drives HDD and/or DVDs. At least one HDD may have the configuration shown in FIG. 14 and/or at least one DVD drive may have the configuration shown in FIG. 15. The HDD may be a mini-HDD that includes one or more platters having a diameter that is smaller than approximately 1.8". The powertrain control system 932 may be connected to memory 947 such as RAM, ROM, low latency nonvolatile memory such as flash memory, and/or other suitable electronic data storage. The powertrain control system 932 also may support connections with a WLAN via a WLAN network interface 948. The control system 940 may also include mass data storage, memory and/or a WLAN interface (none shown).

Figure 18:
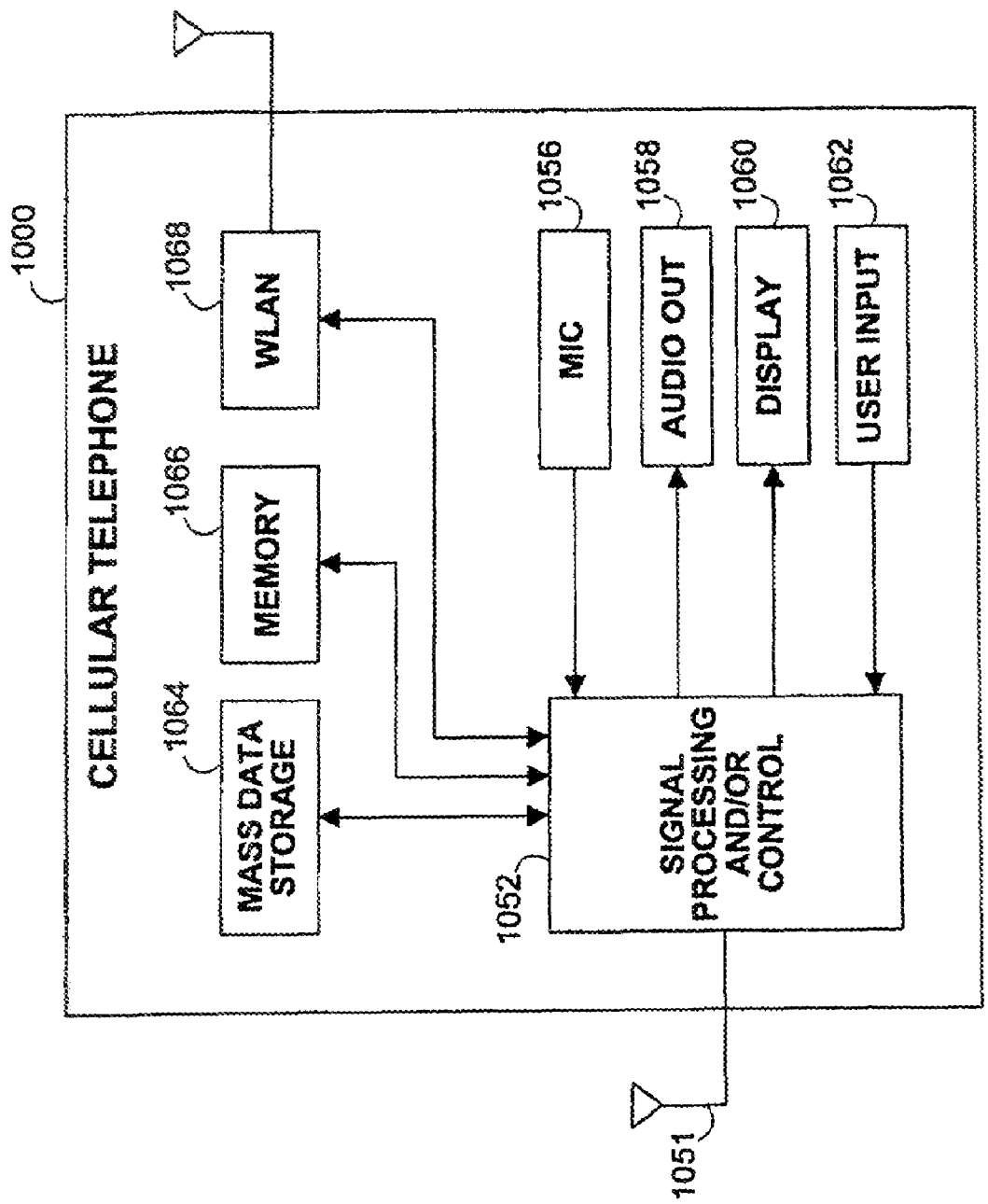
FIG. 18 is a block diagram of an exemplary cellular telephone that can employ the disclosed technology.

Referring now to FIG. 18, the present invention can be implemented in a cellular telephone 1000 that may include a cellular antenna 1051. The present invention may implement either or both signal processing and/or control circuits, which are generally identified in FIG. 18 at 1052, a WLAN interface and/or mass data storage of the cellular phone 1050. In some implementations, the cellular telephone 1050 includes a microphone 1056, an audio output 1058 such as a speaker and/or audio output jack, a display 1060 and/or an input device 1062 such as a keypad, pointing device, voice actuation and/or other input device. The signal processing and/or control circuits 1052 and/or other circuits (not shown) in the cellular telephone 1050 may process data, perform coding and/or encryption, perform calculations, format data and/or perform other cellular telephone functions.

The cellular telephone 1050 may communicate with mass data storage 1064 that stores data in a nonvolatile manner such as optical and/or magnetic storage devices—for example hard disk drives (HDDs) and/or DVDs. At least one HDD may have the configuration shown in FIG. 14 and/or at least one DVD drive may have the configuration shown in FIG. 15. The HDD may be a mini-HDD that includes one or more platters having a diameter that is smaller than approximately 1.8". The cellular telephone 1000 may be connected to memory 1066 such as RAM, ROM, low-latency nonvolatile memory such as flash memory, and/or other suitable electronic data storage. The cellular telephone 1000 also may support connections with a WLAN via a WLAN network interface 1068.

Figure 19:
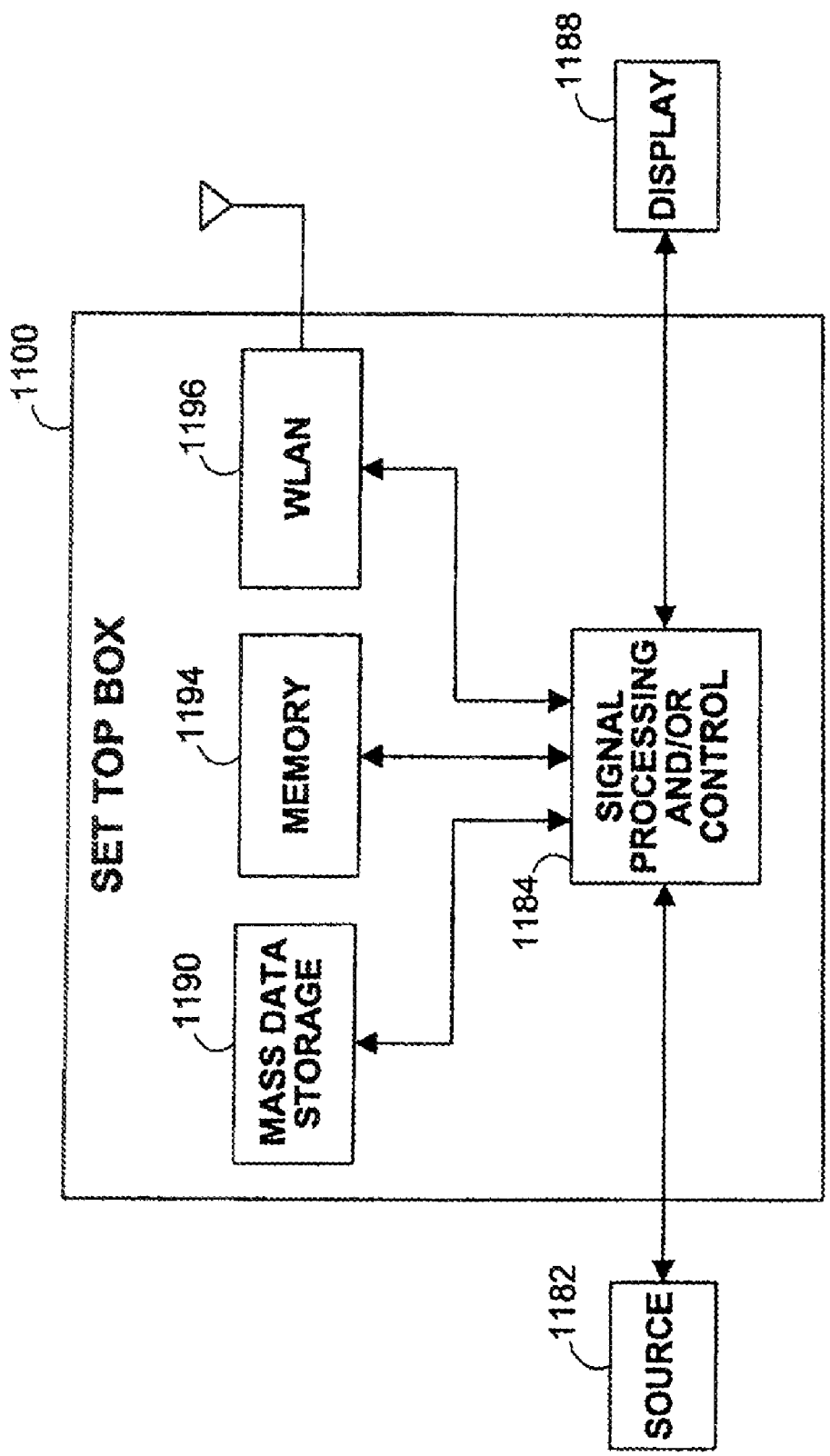
FIG. 19 is a block diagram of an exemplary set top box that can employ the disclosed technology.

Referring now to FIG. 19, the present invention can be implemented in a set top box 1100. The present invention may implement either or both signal processing and/or control circuits, which are generally identified in FIG. 19 at 1184, a WLAN interface and/or mass data storage of the set top box 1180. Set top box 1180 receives signals from a source 1182 such as a broadband source and outputs standard and/or high definition audio/video signals suitable for a display 1188 such as a television and/or monitor and/or other video and/or audio output devices. The signal processing and/or control circuits 1184 and/or other circuits (not shown) of the set top box 1180 may process data, perform coding and/or encryption, perform calculations, format data and/or perform any other set top box function.

Set top box 1100 may communicate with mass data storage 1190 that stores data in a nonvolatile manner. The mass data storage 1190 may include optical and/or magnetic storage devices for example hard disk drives HDD and/or DVDs. At least one HDD may have the configuration shown in FIG. 14 and/or at least one DVD drive may have the configuration shown in FIG. 15. The HDD may be a mini-HDD that includes one or more platters having a diameter that is smaller than approximately 1.8". Set top box 1100 may be connected to memory 1194 such as RAM, ROM, low-latency nonvolatile memory such as flash memory, and/or other suitable electronic data storage. Set top box 1100 also may support connections with a WLAN via a WLAN network interface 1196.

Figure 20:
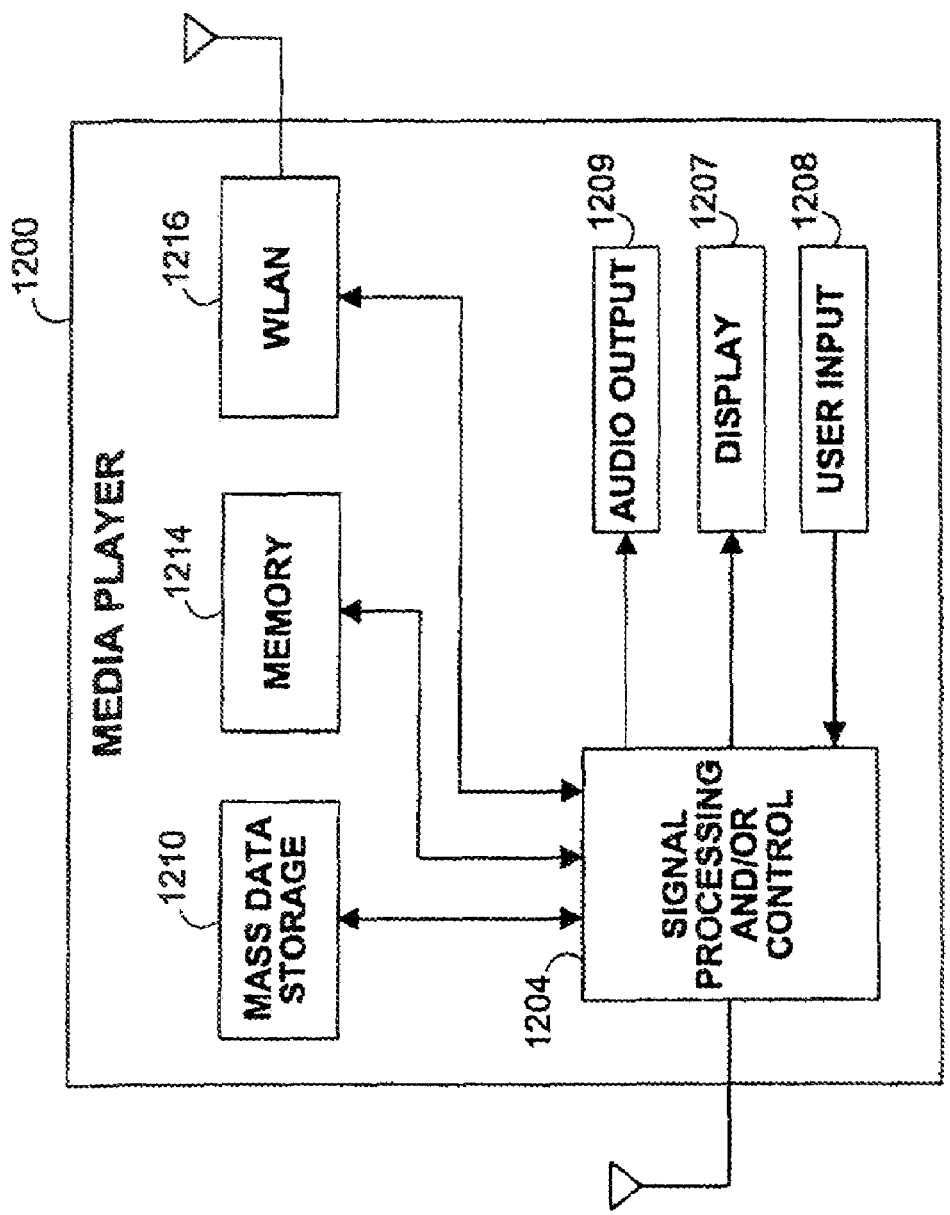
FIG. 20 is a block diagram of an exemplary media player that can employ the disclosed technology.

Referring now to FIG. 20, the present invention can be implemented in a media player 1200. The present invention may implement either or both signal processing and/or control circuits, which are generally identified in FIG. 20 at 1204, a WLAN interface and/or mass data storage of the media player 1200. In some implementations, the media player 1200 includes a display 1207 and/or a user input 1208 such as a keypad, touchpad and the like. In some implementations, the media player 1200 may employ a graphical user interface (GUI) that typically employs menus, drop down menus, icons and/or a point-and-click interface via the display 1207 and/or user input 1208. Media player 1200 further includes an audio output 1209 such as a speaker and/or audio output jack. The signal processing and/or control circuits 1204 and/or other circuits (not shown) of media player 1200 may process data, perform coding and/or encryption, perform calculations, format data and/or perform any other media player function.

Media player 1200 may communicate with mass data storage 1210 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 14 and/or at least one DVD drive may have the configuration shown in FIG. 15. The HDD may be a mini-HDD that includes one or more platters having a diameter that is smaller than approximately 1.8". Media player 1200 may be connected to memory 1214 such as RAM, ROM, low-latency nonvolatile memory such as flash memory, and/or other suitable electronic data storage. Media player 1200 also may support connections with a WLAN via a WLAN network interface 1216. Still other implementations in addition to those described above are contemplated.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for controlling a motor of a type whose speed is measured by detecting back-EMF from pole pair interaction, said method comprising:
   establishing a back-EMF detection period;
   reducing voltage drop across said motor at least during said detection period;
   tristating a first phase of said motor at least while said voltage drop is reduced;
   driving a second phase of said motor with a voltage at an upper end of said reduced voltage drop; and
   driving a third phase of said motor with a voltage at a lower end of said reduced voltage drop.

2. The method of claim 1 wherein said tristating begins prior to said detection period.

3. The method of claim 1 wherein said reducing comprises regulating said lower end of said voltage drop such that said voltage drop across said motor ranges between said supply voltage and a voltage above ground.

4. The method of claim 3 wherein said regulating comprises:
feeding back said lower end of said voltage drop; and
comparing said fed back lower end of said voltage drop to a reference voltage above ground.

5. The method of claim 4 further comprising determining said reference voltage above ground by applying a duty cycle factor to said supply voltage.

6. The method of claim 5 wherein:
said voltage drop across said motor varies trapezoidally over time; and
said duty cycle factor comprises a ratio of a user motor speed setting to a maximum motor speed setting.

7. The method of claim 5 wherein:
said voltage drop across said motor varies sinusoidally over time; and
said duty cycle factor comprises a product of (a) a ratio of a user motor speed setting to a maximum motor speed setting, and (b) a factor representing sinusoidal variation of said time-varying voltage.

8. The method of claim 7 wherein said factor representing sinusoidal variation of said time-varying voltage is approximated as a constant.

9. The method of claim 1 wherein said reducing comprises regulating said upper end of said voltage drop such that said voltage drop across said motor ranges between ground and a voltage below said supply voltage.

10. The method of claim 9 wherein said regulating comprises:
feeding back said upper end of said voltage drop; and
comparing said fed back upper end of said voltage drop to a reference voltage below said supply voltage.

11. The method of claim 10 further comprising determining said reference voltage below said supply voltage by applying a duty cycle factor to said supply voltage.

12. The method of claim 11 wherein:
said voltage drop across said motor varies trapezoidally over time; and
said duty cycle factor comprises a ratio of a user motor speed setting to a maximum motor speed setting.

13. The method of claim 11 wherein:
said voltage drop across said motor varies sinusoidally over time; and
said duty cycle factor comprises a product of (a) a ratio of a user motor speed setting to a maximum motor speed setting, and (b) a factor representing sinusoidal variation of said time-varying voltage.

14. The method of claim 13 wherein said factor representing sinusoidal variation of said time-varying voltage is approximated as a constant.

15. The method of claim 1 wherein:
said voltage drop across said motor varies over time; and
said reducing comprises reducing said voltage drop to an average value of said time-varying voltage drop.

16. The method of claim 15 wherein said reducing comprises applying a duty cycle factor to said supply voltage.

17. The method of claim 16 wherein:
said time-varying voltage varies trapezoidally; and
said duty cycle factor comprises a ratio of a user motor current setting to a maximum motor current setting.

18. The method of claim 16 wherein:
said time-varying voltage varies sinusoidally; and
said duty cycle factor comprises a product of (a) a factor representing sinusoidal variation of said time-varying voltage, and (b) a ratio of a user motor current setting to a maximum motor current setting.

19. The method of claim 18 wherein said factor representing sinusoidal variation of said time-varying voltage is approximated as a constant.

20. Apparatus for controlling a motor of a type whose speed is measured by detecting back-EMF from pole pair interaction, said apparatus comprising:
a driver circuit for a first phase of said motor that accepts user signals to establish a back-EMF detection period;
a respective driver circuit for each of said second and third phases that reduces voltage drop across respective phases of said motor at least during said detection period; wherein:
said driver circuit for said first phase tristates said first phase at least while said voltage drop is reduced;
said driver circuit for said second phase drives said second phase to a voltage at an upper end of said reduced voltage drop; and
said driver circuit for said third phase drives said third phase to a voltage at a lower end of said reduced voltage drop.

21. The apparatus of claim 20 wherein said driver circuit for said first phase tristates said first phase prior to said detection period.

22. The apparatus of claim 20 wherein said driver circuit for said third phase regulates said lower end of said voltage drop such that said voltage across said motor ranges between said supply voltage and a voltage above ground.

23. The apparatus of claim 22 wherein said driver circuit for said third phase comprises:
an amplifier for outputting said lower end of said voltage drop; and
a feedback path that feeds back said lower end of said voltage drop to said amplifier; wherein:
said amplifier compares said fed back lower end of said voltage drop to a reference voltage above ground.

24. The apparatus of claim 23 further comprising a reference voltage generator that generates said reference voltage above ground by applying a duty cycle factor to said supply voltage.

25. The apparatus of claim 24 wherein:
said voltage drop across said motor varies trapezoidally over time; and
said duty cycle factor comprises a ratio of a user motor speed setting to a maximum motor speed setting.

26. The apparatus of claim 24 wherein:
said voltage drop across said motor varies sinusoidally over time; and
said duty cycle factor comprises a product of (a) a ratio of a user motor speed setting to a maximum motor speed setting, and (b) a factor representing sinusoidal variation of said time-varying voltage.

27. The apparatus of claim 26 wherein said factor representing sinusoidal variation of said time-varying voltage is approximated as a constant.

28. The apparatus of claim 27 wherein said reference voltage generator comprises an input for adjusting said constant.

29. The apparatus of claim 20 wherein said driver circuit for said second phase regulates said upper end of said voltage drop such that said voltage across said motor ranges between ground and a voltage below said supply voltage.

30. The apparatus of claim 29 wherein said driver circuit for said second phase comprises:
- an amplifier for outputting said upper end of said voltage drop; and
- a feedback path that feeds back said upper end of said voltage drop to said amplifier; wherein:
- said amplifier compares said fed back upper end of said voltage drop to a reference voltage below said supply voltage.

31. The apparatus of claim 30 further comprising a reference voltage generator that generates said reference voltage below said supply voltage by applying a duty cycle factor to said supply voltage.

32. The apparatus of claim 31 wherein:
- said voltage drop across said motor varies trapezoidally over time; and
- said duty cycle factor comprises a ratio of a user motor speed setting to a maximum motor speed setting.

33. The apparatus of claim 31 wherein:
- said voltage drop across said motor varies sinusoidally over time; and
- said duty cycle factor comprises a product of (a) a ratio of a user motor speed setting to a maximum motor speed setting, and (b) a factor representing sinusoidal variation of said time-varying voltage.

34. The apparatus of claim 33 wherein said factor representing sinusoidal variation of said time-varying voltage is approximated as a constant.

35. The apparatus of claim 34 wherein said reference voltage generator comprises an input for adjusting said constant.

* * * * *